(12) United States Patent
Kang

(10) Patent No.: US 9,883,236 B2
(45) Date of Patent: Jan. 30, 2018

(54) BROADCAST SIGNAL RECEIVING APPARATUS, BROADCAST SIGNAL RECEIVING SYSTEM AND CONTROLLING METHOD THEREOF

(71) Applicant: SAMSUNG ELECTRONICS CO., LTD., Suwon-si, Gyeonggi-do (KR)

(72) Inventor: Woo-Chul Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/918,688

(22) Filed: Oct. 21, 2015

(65) Prior Publication Data
US 2016/0127773 A1    May 5, 2016

(30) Foreign Application Priority Data
Nov. 5, 2014    (KR) .......................... 10-2014-0152929

(51) Int. Cl.
*H04N 7/16* (2011.01)
*H04N 21/443* (2011.01)
(Continued)

(52) U.S. Cl.
CPC ........ *H04N 21/4436* (2013.01); *H04H 20/08* (2013.01); *H04N 5/50* (2013.01);
(Continued)

(58) Field of Classification Search
USPC .......................................... 348/707; 725/151
See application file for complete search history.

(56) References Cited

U.S. PATENT DOCUMENTS 5,327,172 A * 7/1994 Tan ..................... G06F 11/2015
                                                        340/3.44
5,349,391 A * 9/1994 Spiero ................... H04N 5/765
                                                        307/115
(Continued)

FOREIGN PATENT DOCUMENTS

KR    10-2008-0029381 A    4/2008
KR    10-2014-0055505       5/2014

OTHER PUBLICATIONS

European Search Report dated Mar. 9, 2016 issued in corresponding European Patent Application 15191779.6.

*Primary Examiner* — An Son P Huynh
(74) *Attorney, Agent, or Firm* — Staas & Halsey LLP

(57) ABSTRACT

A broadcast signal receiving apparatus including a tuner configured to be tuned to a received broadcast signal of a selected channel, and to make at least a part of the received broadcast signal be looped through to an external apparatus in a normal mode. The broadcast signal receiving apparatus also includes a switch configured to make the broadcast signal be looped through to the external apparatus while in a standby mode of the tuner and a controller configured to control operations of the tuner and the switch when the tuner is converted from the normal mode to the standby mode so that power can be supplied to or cut off from the tuner after a predetermined period of time. The broadcast signal receiving apparatus improves the stability of operations and prevents a macroblock phenomenon of a broadcast signal from being looped through to the external apparatus.

20 Claims, 17 Drawing Sheets

(51) Int. Cl.
  *H04N 5/63* (2006.01)
  *H04N 21/426* (2011.01)
  *H04N 21/438* (2011.01)
  *H04N 5/50* (2006.01)
  *H04H 20/08* (2008.01)
  *H04N 5/268* (2006.01)

(52) U.S. Cl.
  CPC ........... *H04N 5/63* (2013.01); *H04N 21/4263* (2013.01); *H04N 21/4383* (2013.01); *H04N 5/268* (2013.01)

(56) References Cited

U.S. PATENT DOCUMENTS

| | | | | |
|---|---|---|---|---|
| 5,900,913 A * | 5/1999 | Tults | .................. | H04N 5/44513 348/468 |
| 6,317,791 B1 * | 11/2001 | Cohn | ................ | G06F 17/30902 707/E17.12 |
| 7,079,176 B1 * | 7/2006 | Freeman | ................ | H04N 5/445 348/207.1 |
| 8,909,819 B2 * | 12/2014 | Anandakumar | ......... | H04N 5/44 375/316 |
| 2002/0152473 A1 * | 10/2002 | Unger | .................. | H04H 20/426 725/120 |
| 2003/0035070 A1 * | 2/2003 | Fanous | ............... | H03F 3/45183 348/707 |
| 2004/0162044 A1 * | 8/2004 | Yun | .......................... | H04B 1/18 455/191.3 |
| 2005/0244132 A1 * | 11/2005 | Nakakura | .............. | H04N 5/782 386/213 |
| 2006/0082690 A1 * | 4/2006 | Englert | .................. | H04N 5/445 348/731 |
| 2006/0128328 A1 * | 6/2006 | Shah | ........................ | H03H 7/38 455/178.1 |
| 2007/0013816 A1 * | 1/2007 | Martin | ................... | H04N 5/782 348/730 |
| 2007/0014533 A1 * | 1/2007 | Korehisa | .............. | G11B 27/105 386/296 |
| 2007/0040947 A1 * | 2/2007 | Koga | ........................ | H04N 5/63 348/725 |
| 2007/0268403 A1 * | 11/2007 | Oda | ........................ | H04N 5/63 348/460 |
| 2009/0046205 A1 * | 2/2009 | Strasser | .................... | H04N 5/63 348/634 |
| 2009/0096777 A1 * | 4/2009 | Miyabe | ................ | G09G 3/2092 345/213 |
| 2009/0195693 A1 * | 8/2009 | Yokoyama | ........... | H03G 3/3068 348/554 |
| 2009/0273713 A1 * | 11/2009 | Goldman | ............... | G08B 21/10 348/563 |
| 2010/0134219 A1 * | 6/2010 | Luo | ......................... | H03J 3/185 334/78 |
| 2010/0295839 A1 * | 11/2010 | Nagaya | ................ | G06F 1/3265 345/212 |
| 2010/0302456 A1 * | 12/2010 | Testin | ......................... | G06F 1/3203 348/706 |
| 2012/0140122 A1 * | 6/2012 | Lai | ........................... | H04B 1/18 348/707 |
| 2013/0242202 A1 * | 9/2013 | Shintani | ............... | H04N 21/426 348/730 |
| 2013/0246815 A1 * | 9/2013 | Uehara | ................... | H02J 9/061 713/300 |

* cited by examiner

BROADCAST SIGNAL RECEIVING APPARATUS, BROADCAST SIGNAL RECEIVING SYSTEM AND CONTROLLING METHOD THEREOF

CROSS-REFERENCE TO RELATED APPLICATIONS

This application claims priority from Korean Patent Application No. 10-2014-0152929, filed on Nov. 5, 2014 in the Korean Intellectual Property Office, the disclosure of which is incorporated herein by reference.

BACKGROUND

1. Field

Apparatuses and methods consistent with the exemplary embodiments relate to a broadcast signal receiving apparatus, a broadcast signal receiving system and a controlling method thereof, and more particularly to a broadcast signal receiving apparatus which outputs a broadcast signal to the exterior, a broadcast signal receiving system and a controlling method thereof.

2. Description of the Related Art

A set-top box (STB) and the like broadcast signal receiving apparatus receive satellite, cable and terrestrial broadcast signals and process them to be displayed as images on a display apparatus (i.e. a main apparatus).

The broadcast signal receiving apparatus may have a loop-through function that a broadcast signal received from a signal source such as a broadcasting station is transmitted to an external apparatus other than a main apparatus, for example, a sub apparatus (also called sub equipment) such as a television (TV), other set-top box, etc. The broadcast signal receiving apparatus supporting the loop-through function may be internally provided with a switch turned on or off in response to conversion of an operation mode.

Typically, the broadcast signal receiving apparatus has a plurality of operation modes, and enters a standby mode, which cuts off power supplied to elements not in use, if a user's control of a power button is input in a normal mode. In the standby mode, the broadcast signal receiving apparatus supplies power only to minimum elements such as a microcomputer (MICOM) in order to reduce power consumption and satisfy restraints imposed on standby power.

In the normal mode, the broadcast signal receiving apparatus transmits a broadcast signal to the external apparatus through a loop-through route of a tuner. Further, if the broadcast signal receiving apparatus enters the standby mode in response to a user's control about a power button, the internal switch is turned on so that the broadcast signal can loop through the switch to the external apparatus.

By the way, the switch is generally controlled to be turned on/off under control based on power supplied to the tuner, and thus there may be a section where a loop-through signal becomes weak while the operation mode is changed. In this case, the broadcast signal may be not normally transmitted to the external apparatus, and problems of macroblock and the like image distortion may arise.

SUMMARY

According to an aspect of an exemplary embodiment, there is provided a broadcast signal receiving apparatus including: a tuner configured to be tuned to a broadcast signal received from a signal source corresponding to a selected channel, and make at least a part of the received broadcast signal be looped through to an external apparatus in a normal mode; a switch configured to make the broadcast signal be looped through to the external apparatus in a standby mode of the tuner; and a controller configured to control operations of the tuner and the switch when the tuner is converted from the normal mode to the standby mode so that power can be supplied to or cut off from the tuner after a predetermined period of time. Thus, the controller is directly connected to the switch and performs on/off control, so that the switch can be controlled independently of the modes of the broadcast signal receiving apparatus, thereby improving stability of operations and preventing a user's inconvenience due to a macroblock and the like in the external apparatus.

The controller may cut off power supplied to the tuner if a first setting time elapses from turning on the switch in response to conversion from the normal mode to the standby mode. Thus, the loop-through route is changed after the switch is completely turned on in response to the conversion to the standby mode, thereby preventing the broadcast signal from being lost or distorted in the external apparatus.

The controller may turn off the switch if a second setting time elapses from supplying power to the tuner in response to conversion from the standby mode to the normal mode. Thus, the loop-through route is changed in the state that the tuner can normally perform the loop-through function even in the conversion to the normal mode, thereby preventing the broadcast signal from being lost or distorted in the external apparatus.

The first setting time and the second setting time may be determined by at least one of characteristics of circuit elements that constitute the switch, delay noise caused when the switch is turned on or off, and an operation delay caused when power is supplied to or cut off from the tuner. Thus, improvement is achieved by considering the circuit design in the apparatus, and the loss of the broadcast signal due to noise basically caused by the operations of the elements in the apparatus.

The controller may output a control signal for turning on or off the switch through an always-on general purpose input/output (AON GPIO) port. Thus, it is possible to always control the switch regardless of the operation modes and whether or not power is supplied to a certain element.

The switch may include a switching device which is turned on if the control signal received through the AON GPIO port has a low level, and turned off if the control signal has a high level. Thus, it is easy to turn on/off the switch in accordance with the levels of the control signal.

The switching device may include a gate terminal to receive the control signal, a drain terminal connecting with the signal receiver for receiving the broadcast signal, and a source terminal connecting with the external apparatus and forming a loop-through route toward the external apparatus. Thus, it is possible to loop through the broadcast signal to the external apparatus in the standby mode.

The tuner may include: a low noise amplifier configured to amplify the received broadcast signal to have low noise; a splitter configured to split the broadcast signal received from the low noise amplifier into a first broadcast signal to be displayed on the display apparatus and a second broadcast signal to be looped through to the external apparatus; and a loop-through route provider configured to make the second broadcast signal split by the splitter be looped through to the external apparatus. Thus, it is possible to loop through the broadcast signal to the external apparatus in the normal mode.

The broadcast signal receiving apparatus may further include a signal processor configured to process the broadcast signal to be displayable on the display apparatus, wherein the first broadcast signal split by the splitter is output to the signal processor. Thus, an image processing process is properly performed with respect to a broadcast screen displayed on the main display apparatus.

The broadcast signal receiving apparatus may further include a user input device configured to receive a user's input about conversion of an operation mode, wherein the controller converts the operation mode into the standby mode if there is a user's control about the user input device in the normal mode, and converts the operation mode into the normal mode if there is a user's control about the user input device in the standby mode. Thus, it is convenient to convert the operation mode by controlling the power button.

The broadcast signal receiving apparatus may include a set-top box configured to output a broadcast signal to the display apparatus, and the external apparatus may include one of a sub display apparatus other than the display apparatus and another set-top box. Thus, the broadcast signal can be output from one set-top box to two or more display apparatuses, thereby providing a system convenient for a user to view a broadcast.

According to another aspect of an exemplary embodiment, there is provided a method of controlling a broadcast signal receiving apparatus for outputting a broadcast signal to a display apparatus, the method including: controlling at least a part of a broadcast signal received from a signal source to be looped through to an external apparatus different from the display apparatus via a tuner in a normal mode; and controlling the broadcast signal to be looped through to the external apparatus via a switch in a standby mode of the tuner, wherein a controller of the broadcast signal receiving apparatus controls operations of the tuner and the switch when the tuner is converted from the normal mode to the standby mode so that power can be supplied to or cut off from the tuner after a predetermined period of time. Thus, the controller is directly connected to the switch and performs on/off control, so that the switch can be controlled independently of the modes of the broadcast signal receiving apparatus, thereby improving stability of operations and preventing a user's inconvenience due to a macroblock and the like in the external apparatus.

The method may further include: sensing conversion from the normal mode to the standby mode; turning on the switch in response to the conversion into the standby mode; and cutting off power supplied to the tuner if a first setting time elapses from turning on the switch. Thus, the loop-through route is changed after the switch is completely turned on in response to the conversion to the standby mode, thereby preventing the broadcast signal from being lost or distorted in the external apparatus.

The method may further include: sensing conversion from the standby mode to the normal mode; supplying power to the tuner in response to the conversion into the normal mode; and turning off the switch if a second setting time elapses from supplying the power to the tuner. Thus, the loop-through route is changed in the state that the tuner can normally perform the loop-through function even in the conversion to the normal mode, thereby preventing the broadcast signal from being lost or distorted in the external apparatus.

The first setting time and the second setting time may be determined by at least one of characteristics of circuit elements that constitute the switch, delay noise caused when the switch is turned on or off, and an operation delay caused when power is supplied to or cut off from the tuner. Thus, improvement is achieved by considering the circuit design in the apparatus, and the loss of the broadcast signal due to noise basically caused by the operations of the elements in the apparatus.

The turning on the switch and the turning off the switch include outputting a control signal for turning on or off the switch through an always-on general purpose input/output (AON GPIO) port of the controller. Thus, it is possible to always control the switch regardless of the operation modes and whether or not power is supplied to a certain element.

The switch may include a switching device which is turned on if the control signal received through the AON GPIO port has a low level, and turned off if the control signal has a high level, and the switching device may include a gate terminal to receive the control signal, a drain terminal connecting with the signal receiver for receiving the broadcast signal, and a source terminal connecting with the external apparatus and forming a loop-through route toward the external apparatus. Thus, it is easy to turn on/off the switch in accordance with the levels of the control signal, and it is possible to loop through the broadcast signal to the external apparatus in the standby mode.

The method may further include: amplifying the received broadcast signal to have low noise in the normal mode; splitting the broadcast signal amplified to have the low noise into a first broadcast signal to be displayed on the display apparatus and a second broadcast signal to be looped through to the external apparatus; and making the split second broadcast signal be looped through to the external apparatus. Thus, an image processing process is properly performed with respect to a broadcast screen displayed on the main display apparatus in the normal mode, and it is also possible to loop through the broadcast signal to the external apparatus.

The method may further include: processing and outputting the split first broadcast signal to the display apparatus. Thus, it is possible to view a broadcast through the display apparatus.

The method may further include: receiving a user's input about conversion of an operation mode through a user input device, wherein the broadcast signal receiving apparatus converts the operation mode into the standby mode if a user's control about the user input device is sensed in the normal mode, and converts the operation mode into the normal mode if a user's control about the user input device is sensed in the standby mode. Thus, it is convenient to convert the operation mode by controlling the power button.

The broadcast signal receiving apparatus may include a set-top box configured to output a broadcast signal to the display apparatus, and the external apparatus may include one of a sub display apparatus other than the display apparatus and another set-top box. Thus, the broadcast signal can be output from one set-top box to two or more display apparatuses, thereby providing a system convenient for a user to view a broadcast.

According to still another aspect of an exemplary embodiment, there is provided a system including a broadcast signal receiving apparatus, a main display apparatus and an external apparatus, the system including: the broadcast signal receiving apparatus comprising: a tuner configured to be tuned to a broadcast signal received from a signal source corresponding to a selected channel, and make at least a part of the received broadcast signal be looped through to an external apparatus in a normal mode; a signal processor configured to process the broadcast signal to be displayable on a display apparatus; a switch configured to make the broadcast signal be looped through to the external apparatus in a standby mode of the tuner; and a controller configured to control operations of the tuner and the switch when the tuner is converted from the normal mode to the standby mode so that power can be supplied to or cut off from the tuner after a predetermined period of time, wherein the broadcast signal processed by the signal processor is output to the main display apparatus. Thus, the controller is directly connected to the switch and performs on/off control, so that the switch can be controlled independently of the modes of the broadcast signal receiving apparatus, thereby improving stability of operations and preventing a user's inconvenience due to a macroblock and the like in the external apparatus.

The controller may cut off power supplied to the tuner if a first setting time elapses from turning on the switch in response to conversion from the normal mode to the standby mode. Thus, the loop-through route is changed after the switch is completely turned on in response to the conversion to the standby mode, thereby preventing the broadcast signal from being lost or distorted in the external apparatus.

The controller may turn off the switch if a second setting time elapses from supplying power to the tuner in response to conversion from the standby mode to the normal mode. Thus, the loop-through route is changed in the state that the tuner can normally perform the loop-through function even in the conversion to the normal mode, thereby preventing the broadcast signal from being lost or distorted in the external apparatus.

The broadcast signal receiving apparatus may include a set-top box connected to the main display apparatus, and the external apparatus may include one of a sub display apparatus and another set-top box. Thus, the broadcast signal can be output from one set-top box to two or more display apparatuses, thereby providing a system convenient for a user to view broadcasting.

According to an aspect of an exemplary embodiment, method of switching a broadcast signal to an external apparatus may include detecting whether an operation mode of a broadcast signal receiving apparatus is a first operation mode or a second operation mode, and changing, by way of a hardware-based processor, a route of the broadcast signal in response to the detected operation mode, wherein when the operation mode is detected to be the first operation mode, a switch of the broadcast signal receiving apparatus is turned off and the broadcast signal is routed to an external device through a first route that includes a tuner of the broadcast signal receiving apparatus and when the operation mode is detected to be the second operation mode, the switch of the broadcast signal receiving apparatus is turned on and the broadcast signal is routed to the external device through a second route that includes the switch of the broadcast signal receiving apparatus.

The hardware-based processor may cut off power supplied to the tuner a first predetermined time after the switch has been turned on and the hardware-based processor turns off the switch a second predetermined time after supplying power to the tuner.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION

Figure 1:
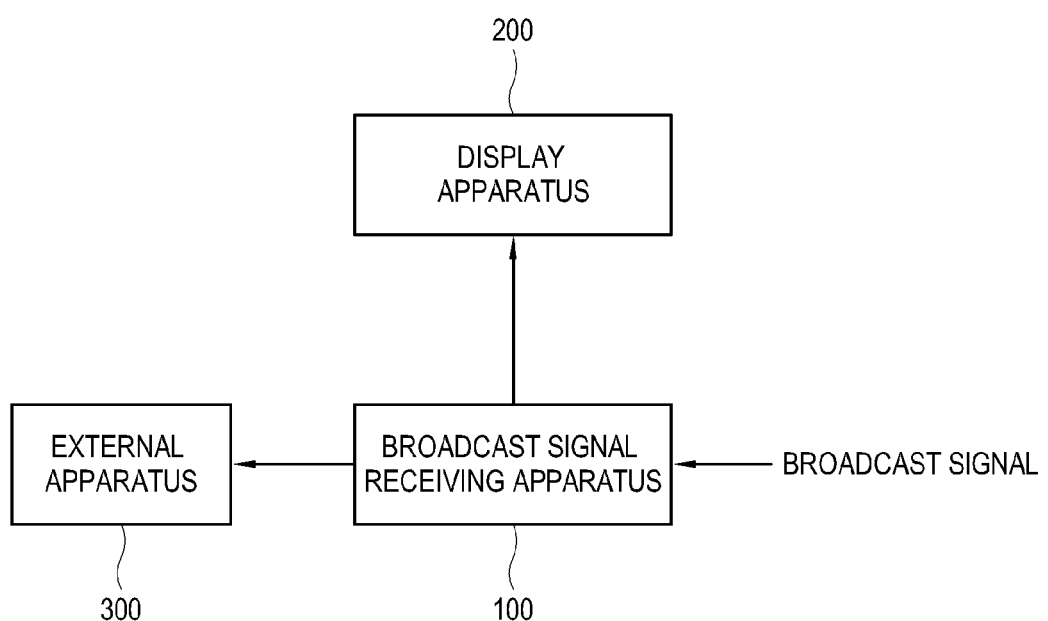
FIG. 1 is a block diagram showing a system including a broadcast signal receiving apparatus, a display apparatus and an external apparatus according to an exemplary embodiment.
Figure 2:
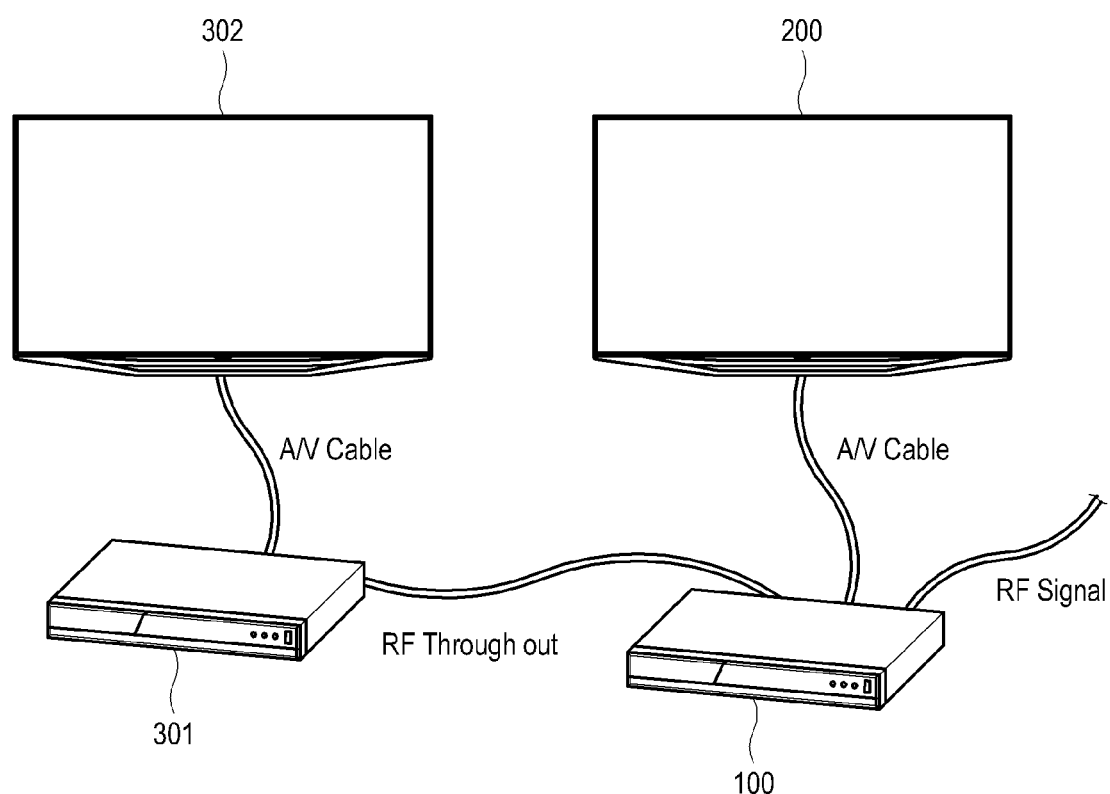
FIG. 2 and FIG. 3 show examples of the system of FIG. 1.
Figure 3:
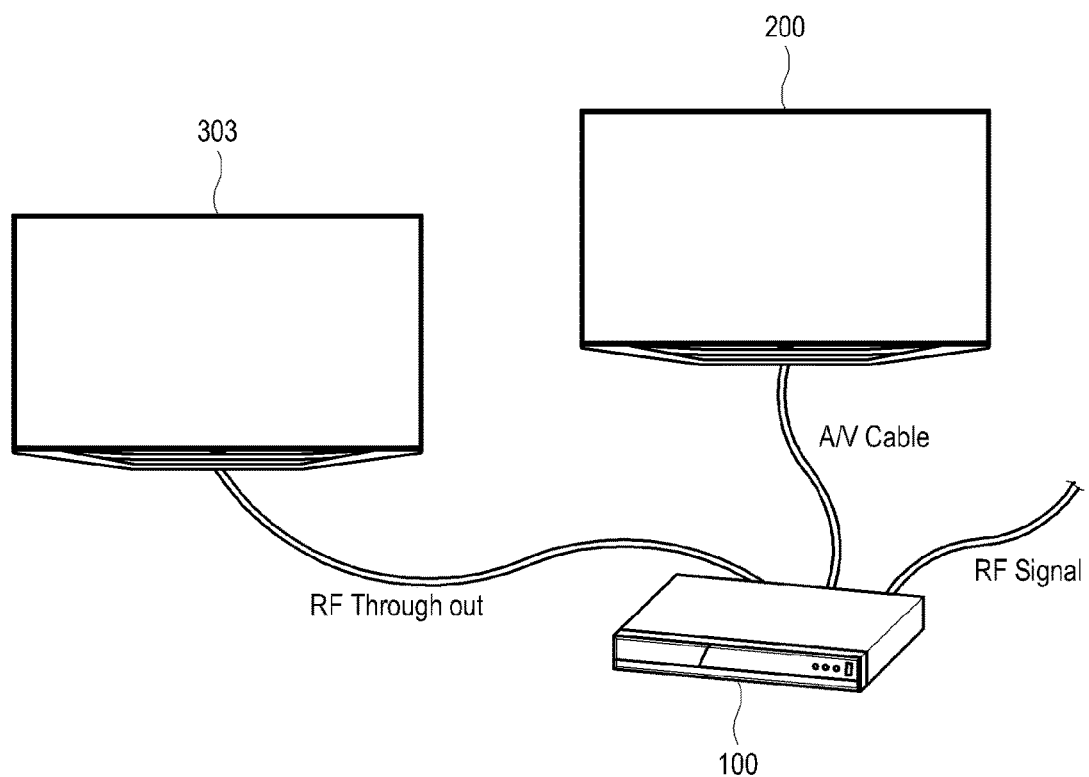

Below, exemplary embodiments will be described in detail with reference to accompanying drawings FIG. 1 is a block diagram showing a system including a broadcast signal receiving apparatus, a display apparatus and an external apparatus according to an exemplary embodiment, and FIG. 2 and FIG. 3 show examples of the system of FIG. 1.

As shown in FIG. 1, the system includes a broadcast signal receiving apparatus 100 that receives and processes a broadcast signal, a display apparatus 200 (hereinafter, referred to as a main apparatus) that displays an image based on the broadcast signal processed by the broadcast signal receiving apparatus 100, and an external apparatus 300 (hereinafter, referred to as a sub apparatus or sub equipment) that receives a loop through broadcast signal from the broadcast signal receiving apparatus 100.

As shown in FIGS. 2 and 3, the broadcast signal receiving apparatus 100 according to an exemplary embodiment may be achieved by a set-top box (STB) that receives and processes a broadcast signal and outputs a video/audio signal to the TV or the like display apparatus 200. Here, the broadcast signal receiving apparatus 200 according to this exemplary embodiment has a loop-through function that outputs at least a part of the received broadcast signal to the external apparatus 300.

The loop-through function is to transmit a loop-through signal to the exterior by directly outputting an input signal without any separate process, which may be for example achieved in the set-top box with two tuners by connecting a loop-through signal of the first tuner to an input of the second tuner, connecting a loop-through signal of the first tuner provided in a predetermined set-top box to an input of the second tuner provided in another set-top box, and so on.

The broadcast signal receiving apparatus 100 receives a broadcast signal from a broadcasting station or any like signal source, that is, a headend (hereinafter, referred to as a headend system or a headend center). That is, an embodiment of FIG. 2 shows that the broadcast signal receiving apparatus 100 is a set-top box that processes a broadcast signal based on broadcast signal/broadcast information/broadcast data received from a signal source. However, the kind of image signal to be processed in the set-top box is not limited to the broadcast signal. For example, the broadcast signal receiving apparatus 100 may process a signal so that the display apparatus 200 can display a moving image, a still image, an application, an on-screen display (OSD), a user interface (UI or also called a graphic user interface (GUI)) for controlling various operations, etc. based on signal data received from various signal sources such as terrestrial, cable and satellite sources. Further, the broadcast signal receiving apparatus 100 may be achieved by a television (TV) including a display and capable of receiving/processing and displaying the broadcast signal or the like. In addition, the signal source is also not limited to the broadcasting station, and includes any device or station as long as it can transmit and receive information.

The display apparatus 200 may be achieved by a Smart TV or an Internet Protocol TV. The Smart TV can receive and display a broadcast signal in real time, and has a web browsing function so that the broadcast signal can be displayed in real time and at the same time various contents can be searched and consumed through Internet. To this end, the Smart TV provides an interface convenient for a user. Further, the Smart TV includes an open software platform in order to provide an interactive service to a user. Therefore, the Smart TV may provide a user with an application that offers various contents, e.g., a predetermined service to a user through the open software platform. Such an application is an application program capable of providing various kinds of service. For example, the application includes applications for social network service (SNS), finance, news, weather, a map, music, movie, a game, an electronic book, etc.

In embodiments shown in FIGS. 1 to 3, the display apparatus 200 may access Internet through a communication module provided in the broadcast signal receiving apparatus 100. Alternatively, the broadcast signal receiving apparatus 100 may be a monitor or the like connected to a computer.

In embodiments shown in FIG. 1 to FIG. 3, the display apparatus 200 may access Internet through a built-in communication module of the broadcast signal receiving apparatus 100 and receive service from a service provider. Further, the broadcast signal receiving apparatus 100 may include a monitor or the like connected to a computer.

As shown in FIG. 2 and FIG. 3, the broadcast signal receiving apparatus 100 may output a broadcast signal to the display apparatus 200 and the external apparatus 300 through a wired A/V cable.

FIG. 2 shows that the set-top box and the like broadcast signal receiving apparatus is used as an external apparatus 301 for receiving a loop-through broadcast signal from the broadcast signal receiving apparatus 100. Therefore, the external apparatus 301 may process the broadcast signal received through the broadcast signal receiving apparatus 100 and output the processed signal to the TV or the like display apparatus 302.

FIG. 3 shows an example that an external apparatus 303 receiving the loop-through broadcast signal from the broadcast signal receiving apparatus 100 is achieved by the TV or the like display apparatus. Thus, the external apparatus 303 processes the broadcast signal received through the broadcast signal receiving apparatus 100 and displays it as an image on the display.

To distinguish from the main apparatus, e.g., the display apparatus 200 or a first display apparatus, the display apparatus 302 of FIG. 2 and the display apparatus 303 of FIG. 3 will be called a second display apparatus.

In the foregoing embodiments shown in FIG. 2 and FIG. 3, the external apparatuses 301 and 303 are respectively achieved by the broadcast signal receiving apparatus and the display apparatus, but not limited thereto. For example, the external apparatus 300 may be achieved by a mobile device such as a smart phone, a tablet personal computer (PC) and the like smart pad, an MP3 player, etc., and the loop-through broadcast signal of the broadcast signal receiving apparatus 100 can be output to the external apparatus 300 through various wired and/or wireless communications.

In other words, the following embodiments to be described later are just examples that may vary depending on the systems, and thus do not limit the scope of the invention.

The broadcast signal receiving apparatus 100 according to an exemplary embodiment has a plurality of operation modes (hereinafter, referred to as a power mode), and the plurality of operation modes includes a normal mode and a standby mode.

In the normal mode (hereinafter, referred to as an active mode), power is being supplied to all the elements of the broadcast signal receiving apparatus 100, and the corresponding elements normally operates to perform their functions, for example, receiving and processing the broadcast signal and outputting the processed signal to the display apparatus 300.

On the other hand, the broadcast signal receiving apparatus 100 cuts off power supplied to the elements that are not in use in the standby mode (hereinafter, referred to as a standby power mode, a low power mode, a power saving mode or a passive mode. In the standby mode of the broadcast signal receiving apparatus 100, power is supplied to only minimum elements such as a microcomputer (MI-COM) or a part of a central processing unit (CPU) in order to reduce power consumption and satisfy restraints imposed on standby power (for example, 0.5 W or less), and the other elements are turned off.

In this exemplary embodiment, the broadcast signal receiving apparatus 100 may be converted from the standby mode to the normal mode if there is user control, such as by using a power button provided as a user input device 150. Here, the power button may be provided in a main body of the broadcast signal receiving apparatus 100, or a remote controller and the like input device separated from the main body.

By the way, the broadcast signal receiving apparatus 100 according to an exemplary embodiment may be converted from the normal mode to the standby mode if a predetermined period of time elapses without any operation, for example, if there is no response signal from the signal source for a predetermined period of time. Here, a condition for entering the standby mode may be previously set and stored in a storage 160 to be described later. Such a condition for entering the standby mode may be previously set as a default when a product is released, or may be set or modified by a user.

The broadcast signal receiving apparatus 100 according to an exemplary embodiment may enter the standby mode at a scheduled time based on a user's schedule setting. Further, in the display apparatus 300 using high definition multimedia interface (HDMI) consumer electronic control (CEC), the broadcast signal receiving apparatus 100 may enter the standby mode in response to a CEC signal received through the HDMI.

In the following exemplary embodiments, mode conversion based on a user's control of the power button will be described by way of example. Alternatively, the modes of the broadcast signal receiving apparatus 100 may be converted by various methods.

In an exemplary embodiment, the broadcast signal receiving apparatus 100 in the normal mode transmits a broadcast signal to the external apparatus 200 through a loop-through route of a tuner 110 to be described later. If the broadcast signal receiving apparatus 100 enters the standby mode in response to a user's control of the power button, an internal switch 140 is turned on and the broadcast signal is transmitted to the external apparatus 200 via the switch 140.

That is, the broadcast signal receiving apparatus 100 according to an exemplary embodiment is achieved by an always-on loop-through apparatus capable of always transmitting a loop-through broadcast signal to the external apparatus 200 regardless of its operation mode.

Below, the elements of the broadcast signal receiving apparatus will be described with reference to FIG. 4.

Figure 4:
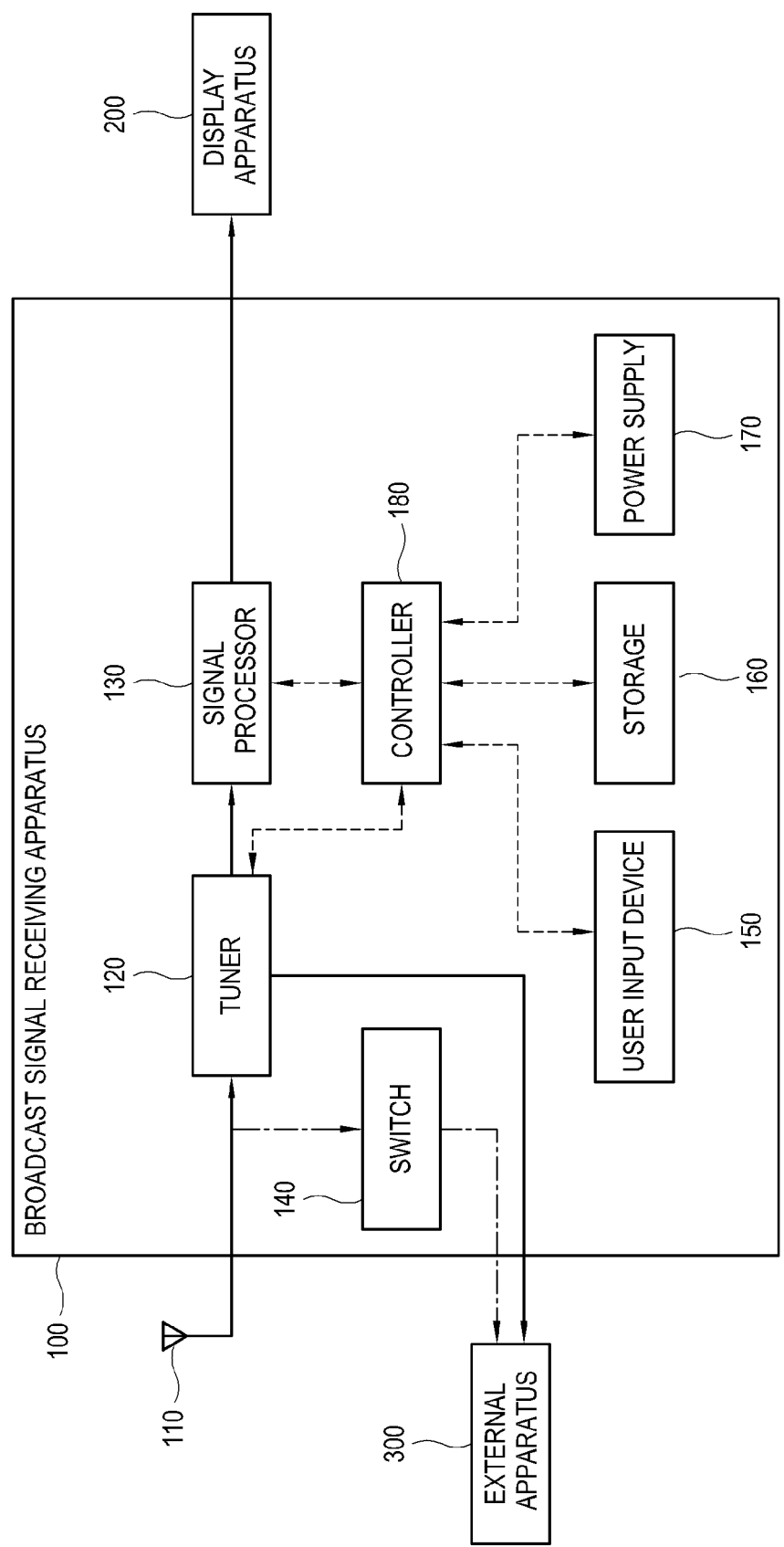
FIG. 4 is a block diagram showing the broadcast signal receiving apparatus according to an exemplary embodiment.
Figure 5:
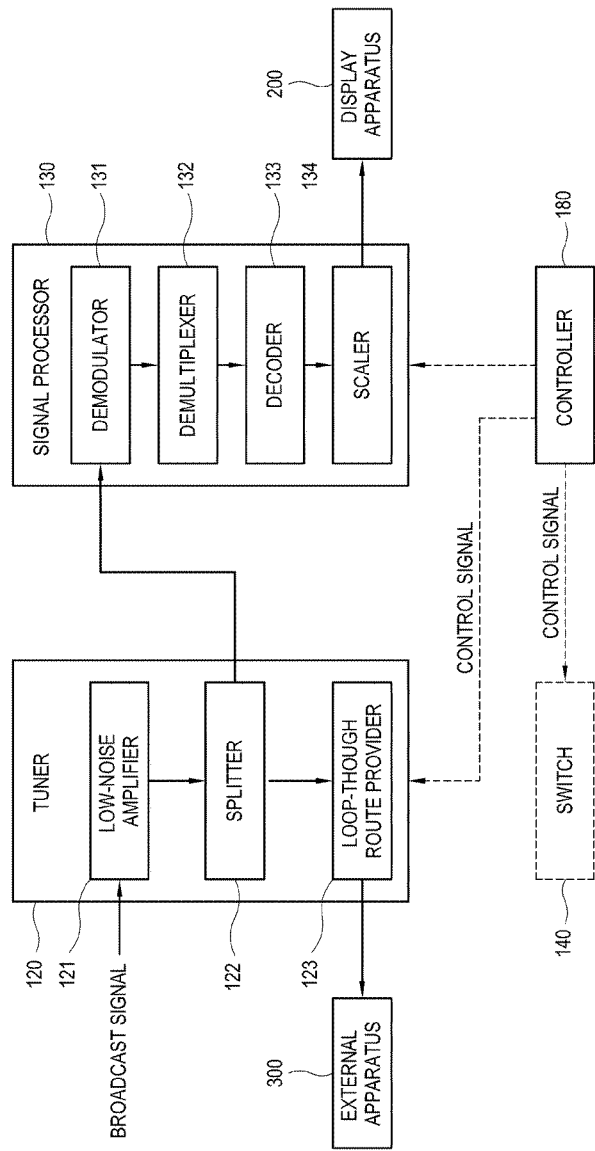
FIG. 5 and FIG. 6 are block diagrams for explaining that a broadcast signal is processed and transmitted in the broadcast signal receiving apparatus of FIG. 4.
Figure 6:
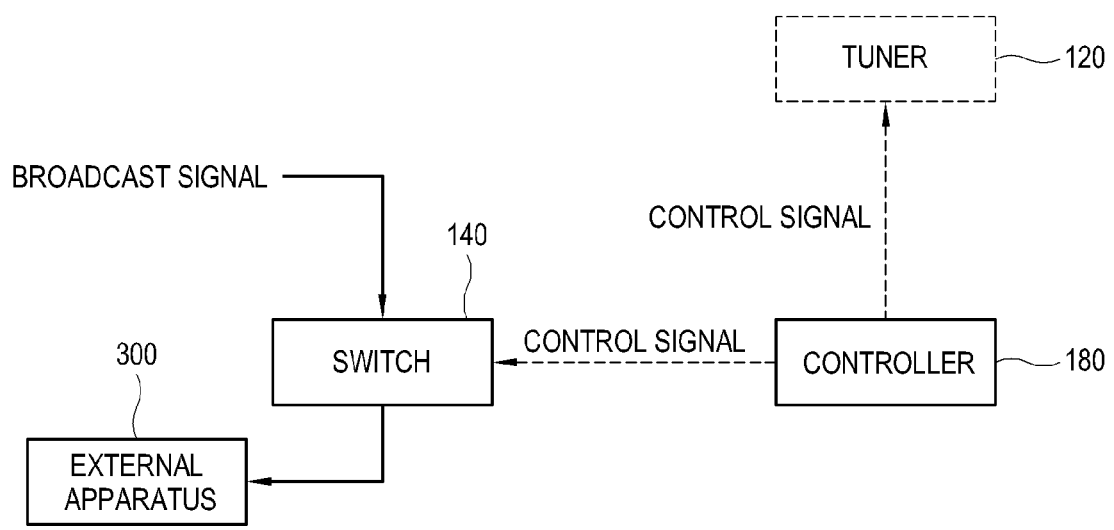

FIG. 4 is a block diagram showing the broadcast signal receiving apparatus according to an exemplary embodiment, and FIG. 5 and FIG. 6 are block diagrams for explaining that a broadcast signal is processed and transmitted in the broadcast signal receiving apparatus of FIG. 4.

As shown in FIG. 4, the broadcast signal receiving apparatus 100 according to an exemplary embodiment includes a signal receiver 110 to receive a broadcast signal from a signal source, a tuner 120 to be tuned to a channel corresponding to the broadcast signal, a signal processor 130 to process the broadcast signal output from the tuner 120, a switch 140 to be turned on or off corresponding to the operation mode and output the broadcast signal to the external apparatus 300, a user input device 150 to receive a user's input, a storage 160 to store various pieces of data, a power supply 170 to supply power to the elements of the broadcast signal receiving apparatus 100, and a controller 170 to control the broadcast signal receiving apparatus 100.

The signal receiver 110 may be variously achieved corresponding to formats of a received broadcast signal and the types of the broadcast signal receiving apparatus 100. For example, the signal receiver 110 may be achieved by an antenna ANT as shown in FIG. 4 and wirelessly receive a radio frequency (RF) signal from a signal source (not shown) such as the broadcasting station.

According to an exemplary embodiment, the signal receiver 110 includes a communication module supporting wired or wireless communication. For example, the signal receiver 110 may include a cable modem connected to the signal source such as a broadcasting station, a cable broadcaster, etc. and receiving a broadcast signal, e.g., video/audio/data signals. The cable modem supports interactive communication, so that a service provider and the broadcast signal receiving apparatus 100 can exchange information through the Internet or the like. For example, if a user uses a video on demand (VOD) service, information about a service charge is transmitted to the service provider through the cable modem under control of the controller 180. Here, the signal receiver 110 may be connected to the headend through one among a plurality of channels. For example, in a case of an 8-channel cable modem, one among 8 channels may be assigned to connect with a certain headend.

The signal receiver 110 may receive an image signal based on composite video, component video, super video, Syndicat des Constructeurs d'Appareils Radiorécepteurs et Téléviseurs (SCART), high definition multimedia interface (HDMI) or the like standards through a wire or a cable. Further, an image signal may be received from an external device. For example, an image signal may be received from the external device such as a personal computer (PC), an audio/video (AV) device, a Smart phone, a Smart pad, etc.

Further, an image signal may be based on data received through Internet or the like network. In this case, the broadcast signal receiving apparatus 100 may further include a network communicator to perform data communication with the exterior. For example, the signal receiver 110 may support at least one of communication interfaces 1 to N, such as a wired local area network (LAN), Bluetooth, Wi-Fi direct, radio frequency (RF), Zigbee, a wireless LAN, Wi-Fi, infrared communication, ultra wideband (UWB), near field communication (NFC), etc.

The image signal may be based on data stored in a flash memory, a hard disk or the like nonvolatile storage 160. The storage 160 may be internally or externally provided in the broadcast signal receiving apparatus 100. If the storage 160 is externally provided, there may be provided a connector (not shown) to which the storage 160 is connected.

The signal receiver 110 in this exemplary embodiment is built-in the main body of the broadcast signal receiving apparatus 100, but may be achieved in the form of a dongle or a module detachably connected to a connector (not shown) of the broadcast signal receiving apparatus 100.

In this exemplary embodiment, it will be described by way of example that the signal receiver 110 receives audio/video contents, e.g., an RF signal from the signal source by a wire or wirelessly.

The tuner 120 may be tuned to a channel corresponding to a broadcast signal input through terrestrial waves, a cable or a satellite. The tuner 120 may be achieved by a tuner IC, for example, an MOPLL IC or a tuner module, which includes a mixer, a phase locked loop and an oscillator. In this exemplary embodiment, the tuner 120 is tuned to a broadcast signal (i.e. a first broadcast signal) split by a splitter 122 to be described later, and converts the tuned broadcast signal to have an intermediate frequency by mixing with an oscillation frequency, thereby outputting the broadcast signal to a demodulator 131 of the signal processor 130.

The tuner 120 in this exemplary embodiment may include a low noise amplifier (LNA) 121, a splitter 122, a loop-through route provider 123 as shown in FIG. 5.

The low noise amplifier 121 is connected between the signal receiver 110 and the splitter 122, and performs low-noise amplification of a high frequency RF signal received from the signal receiver 110, thereby outputting the amplified signal to the splitter 122. The low noise amplifier 121 minimizes a noise component of the RF broadcast signal and amplifies only the signal component, thereby providing the signal to the splitter 122.

The splitter 122 splits the RF broadcast signal received through the signal receiver 110 into two signals. In the broadcast signal receiving apparatus 100 according to an exemplary embodiment, the splitter 122 splits the broadcast signal received in the signal receiver 110 into a first broadcast signal to be output to the display apparatus 200 and a second broadcast signal to be looped through to the external apparatus 300.

The splitter 122 is achieved by a power distributor, for example, a balun circuit including two inductors, and distributes the input broadcast signal into the first broadcast signal and the second broadcast signal in accordance with inductance ratios of inductors (for example, 1:1 balun, 1:3 balun, and so on). Such distributed first and second broadcast signals are respectively output to the signal processor 130 and the external apparatus 300.

The loop-through route provider 123 provides a loop-through route through which the second broadcast signal split by and output from the splitter 122 is output to the external apparatus 300. That is, the broadcast signal received in the signal receiver 110 undergoes the low-noise amplification through the low noise amplifier 121 and is then input to the splitter 122, and the splitter 122 splits the low-noise amplified broadcast signal into a signal (e.g., the first broadcast signal) to be output to the signal processor 130 and another signal (e.g., the second broadcast signal) to be output to the loop-through route provider 123.

In this exemplary embodiment, the loop-through route provider 123 may be for example achieved by a switch, a gate or the like that is turned on when the split second broadcast signal passes, but not limited thereto. That is, the loop-through route provider 123 may be achieved by any element as long as it can provide a loop-through route using the tuner 120 in the broadcast signal receiving apparatus 100 of the normal mode. In this exemplary embodiment, the loop-through route provider 123 is provided as an active loop-through that operates when the tuner 120 is turned on.

The signal processor 130 performs various video/audio processing processes previously set with regard to a broadcast signal received through the tuner 120. The signal processor 130 sends an output signal generated or combined by performing the processing processes to the display apparatus 200, so that the display apparatus 200 can display an image and output a sound corresponding to the broadcast signal.

As shown in FIG. 5, the signal processor 130 includes a demodulator 131 that demodulates a digital broadcast signal (e.g., the first broadcast signal) of a certain tuned channel into a signal in the form of a transport stream (TS); a demultiplexer 132 that demultiplexes the broadcast signal into signals according to characteristics, such as an image signal, an audio signal, and various additional data; a decoder 133 that decodes the TS signal according to video formats of the broadcast signal receiving apparatus 100; and a scaler 134 that adjusts the broadcast signal according to output scales of the display apparatus 200. In this exemplary embodiment, the decoder 125 may be for example achieved by a moving picture experts group (MPEG) decoder.

The kind of video processing processes performed by the signal processor 130 is not limited to those shown in FIG. 5 and may for example include de-interlacing for converting an interlaced type into a progressive type, noise reduction for improving image quality, detail enhancement, frame refresh rate conversion, etc.

The signal processor 130 may be achieved by an individual group for independently performing each of the processes, or may be achieved by a system-on-chip (SoC) where various functions corresponding to such processes are integrated.

The video/audio signals processed by the signal processor 130 are output to the display apparatus 200. In this exemplary embodiment, the broadcast signal receiving apparatus 100 may further include an A/V output (not shown) that outputs a video or audio signal processed by the signal processor 130 to the display apparatus 200 connected by a data communication cable such as a D-sub or the like. The A/V output connects with an A/V input of the display apparatus 200 and outputs a video/audio signal.

If the broadcast signal receiving apparatus 100 is achieved by a display apparatus such as a TV, the broadcast signal receiving apparatus 100 may include a display for displaying an image. The display provided in the broadcast signal receiving apparatus 100 or the display apparatus 200 may for example be achieved by liquid crystal, plasma, a light emitting diode (LED), an organic light-emitting diode (OLED), a surface-conduction electron-emitter, a carbon nano-tube (CNT), nano-crystal, or the like various displays, without limitation.

The display may include additional elements in accordance with its types. For example, if the display is achieved by the liquid crystal, the display includes a liquid crystal display (LCD) panel (not shown), a backlight unit (not shown) for supplying light to the LCD panel, and a panel driver (not shown) for driving the panel (not shown).

In this exemplary embodiment, the display may include a touch screen for receiving input corresponding to a user's touch. The touch screen may be for example achieved by a resistive type, a capacitive type, an infrared type or an acoustic wave type.

The touch screen may display an object (e.g., a menu, a text, an image, a moving image, a figure, an icon and a shortcut icon) including various menu items as a user interface (UI). Thus, a user touches the object displayed on the touch screen with his/her body (e.g., a finger) or a separate pointing device such as a stylus, thereby performing his/her input.

The touch screen may provide a user with a UI corresponding to various services (e.g., a phone call, data transmission, broadcasting, photographing, a moving image or an application). The touch screen sends the controller 180 an analog signal corresponding to a single or multi touch input corresponding to selection on the UI.

In this exemplary embodiment, the touch input may include any one or more of drag, flick, drag & drop, tap, long tap, etc.

The switch 140 is turned on or off corresponding to the operation mode of the broadcast signal receiving apparatus 100. In this exemplary embodiment, the switch 140 operates in the standby mode so as to output the broadcast signal received in the signal receiver 110 to the external apparatus 200. Here, the switch 140 may include a switching device, for example, a field effect transistor (FET) (see '141' of FIG. 7) that is turned on in the standby mode and turned off in the normal mode. In this exemplary embodiment, the switching device 141 is given as a passive loop-through.

Specifically, in the normal mode where the broadcast signal receiving apparatus 100 is turned on, a high signal is input to the switch 140 connected to the signal receiver 110, and at this time the high signal is also applied to the switching device 141 so that the switch 140 can be turned off. Thus, the broadcast signal received in the signal receiver 110 is not transmitted to the switch 140.

The broadcast signal received in the signal receiver 110 undergoes low-noise amplification through the low noise amplifier 121 and is then input to the splitter 122, and the splitter 122 splits the low-noise amplified broadcast signal and outputs the second broadcast signal to the loop-through route provider 123 that is being turned on. Thus, the second broadcast signal is output to the external apparatus 300 through the loop-through route provider 123.

On the other hand, if the broadcast signal receiving apparatus 100 enters the standby mode, power is not supplied to the low noise amplifier 121 and the low noise amplifier 121 does not operate, thereby outputting no broadcast signal to the splitter 122.

Further, a low signal is applied to a gate terminal of the switching device 141 of the switch 140 connected to the signal receiver 110, thereby turning on the switch 140. Thus, the broadcast signal received in the signal receiver 110 is output to the external apparatus 200 through the switch 140.

According to an exemplary embodiment, the broadcast signal receiving apparatus 100 may include a TV tuner of a tuner chip I where the tuner 120 and the switch 140 are integrated as shown in FIG. 4. In the case where the tuner 120 and the switch 140 are integrated as a single chip I, this chip I may include TDA18250A and TDA18260A manufactured by NXP as a single or dual tuner, and the switching device 141 in the chip may include a metal oxide semiconductor field effect transistor (MOSFET) BF1107 as a zero power loop-through (ZPLT) switch for performing a passive loop-through function of the TV tuner.

Detailed operations of the switch 140 including the switching device 141 will be described later with reference to FIG. 7 and FIG. 8.

The user input device 150 shown in FIG. 4 sends various preset control command or limitless information to the controller 180 in response to a user's control and input.

In this exemplary embodiment, the user input device 150 may include a keypad (or an input panel, not shown) with numeral keys, menu keys or the like buttons provided in a main body of the broadcast signal receiving apparatus 100; a remote controller that generates a preset command/data/information/signal for remotely controlling the TV and transmits it to the broadcast signal receiving apparatus 100 or the display apparatus 200; a keyboard; a mouse; or the like peripheral input device separated from the main body, thereby receiving a user's input. The remote controller may further include a touch sensor for sensing a user's touch and a motion sensor for sensing its own motion caused by a user.

The user input device 150 in this embodiment includes the power button provided in the main body of the broadcast signal receiving apparatus 100 and/or the input device. The power button may be achieved by a toggle switch (for example, a power/standby switch) and convert the operation mode in response to a user's control. For example, if the power button is controlled in the normal mode, the operation mode is converted into the standby mode. On the other hand, if the power button is controlled in the standby mode, the operation mode returns to the normal mode.

The input device is an external device capable of wirelessly communicating with the main body of the broadcast signal receiving apparatus 100, and the wireless communication includes Bluetooth, infrared communication, radio frequency (RF) communication, wireless local area network (LAN), Wi-Fi direct, etc. The input device is controlled by a user and thus transmits a preset command to the broadcast signal receiving apparatus 100.

The keypad includes a physical keypad formed in front and/or lateral sides of the broadcast signal receiving apparatus 100, a virtual keypad displayed on the display apparatus 200, and a wirelessly connectable physical keypad. It will be easily appreciated by those skilled in the art that the physical keypad formed in front and/or lateral sides of the broadcast signal receiving apparatus 100 may be excluded in accordance with the performance or structure of the broadcast signal receiving apparatus 100.

The storage 160 stores limitless types of data under control of the controller 180. The storage 160 may include a nonvolatile memory, a volatile memory, a flash memory, a hard disk drive (HDD) or a solid state drive (SSD). The storage 160 is accessed by the controller 180, and performs reading/recording/modifying/deleting/updating/and the like with regard to data under control of the controller 180.

The data stored in the storage 160 may include, for example, not only an operating system for driving the broadcast signal receiving apparatus 100, but also various applications, image data, additional data, etc. executable on this operating system.

Specifically, the storage 160 may store a signal or data input/output corresponding to operations of the respective elements 110 to 180 under control of the controller 180. The storage 160 may store a graphic user interface (GUI) related to a control program for controlling the broadcast signal receiving apparatus 100 and an application provided by a manufacturer or downloaded from the outside, images for providing the GUI, user information, a document, a database, or related data.

According to an exemplary embodiment, the storage 160 may further store information about a first setting time and a second setting time which are set as delay times taken in turning on or off the tuner 110 and the switch 140 when the operation mode is converted.

According to an exemplary embodiment, the term "storage" may refer to the storage 160, a read only memory (ROM, not shown) in the controller 180, a random access memory (RAM, not shown) or a memory card (not shown, for example, a micro SD card, a memory stick, etc.) mounted to the broadcast signal receiving apparatus 100.

The power supply 170 supplies power to the elements 110 to 160 and 180 of the broadcast signal receiving apparatus 100 under control of the controller 180. The power supply 170 converts external alternating current (AC) power into direct current (DC) power, regulates the converted DC power to have a predetermined level, and supplies the regulated power to the elements 110 to 160 and 180 of the broadcast signal receiving apparatus 100. The power supply 170 may be for example achieved by a switching mode power supply (SMPS), and may include a power converter having a transformer circuit that drops a DC power into predetermined levels corresponding to rated voltages of the internal elements 110 to 160 and 180 of the broadcast signal receiving apparatus 100.

According to an exemplary embodiment, the power supplied from the power supply 170 to the elements 110 to 160 and 180 of the broadcast signal receiving apparatus 100 may be controlled in response to the conversion of the operation mode. For example, if a predetermined set time elapses from the conversion into the standby mode, power may be not supplied to other elements than a part of the controller 180.

The controller 180 performs control with regard various elements of the apparatus 100. For example, the controller 180 proceeds with the receiving/separating of the broadcast signal/video processing process performed by the tuner 120 and the signal processor 120, and performs control operations corresponding to commands from the user input device 150, thereby controlling general operations of the broadcast signal receiving apparatus 100. For example, the controller 180 may be achieved in the form of combining at least one processor such as a central processing unit (CPU), a microcomputer (MICOM), an application processor (AP), etc. with software, chipset, etc. For example, the controller 180 achieved by at least a processor may perform the functions of the broadcast signal receiving apparatus 100 by loading a predetermined program stored in the ROM to the RAM and executing the loaded program.

The controller 180 controls the general operations of the broadcast signal receiving apparatus 100 and signal flow between internal elements 110 to 160 of the apparatus 100, and processes data. The controller 180 controls power supplied from the power supply 170 to the internal elements 110 to 140, 160 and 180. If there is a user's input or if a set and stored condition is satisfied, the controller 180 may perform an operating system (OS) and various applications stored in the storage 160.

In this exemplary embodiment, the controller 180 controls power supplied to the elements including the tuner 110 and the switch 140 in accordance with conversion of the operation mode for the broadcast signal receiving apparatus 100.

Specifically, the controller 180 controls at least a part of a broadcast signal, e.g., the second broadcast signal split from the splitter 122 to be output to the external apparatus 300 through the tuner 110 in the normal mode as shown in FIG. 5.

Further, the controller 180 cuts off the power supplied from the power supply 170 to the tuner 110 so that the broadcast signal can be output to the external apparatus 300 through the switch as shown in FIG. 6, if the first setting time elapses from turning on the switch 140 in response to the conversion from the normal mode to the standby mode.

According to an exemplary embodiment, the loop-through broadcast signal passes through the loop-through route 123 of the tuner 110 or the switch 140 and is transmitted to the external apparatus 200 via a the loop-through port.

In the standby mode, power may be supplied to minimum elements of the controller 180, for example, only a part of the CPU or a microcomputer. At this time, the controller 180 directly outputs a control signal to the switch 140 through an always-on general purpose input/output (AON GPIO) port, and the AON GPIO port is always turned on in both the normal mode and the standby mode. In the broadcast signal receiving apparatus 100 according to an exemplary embodiment, the controller 180 directly controls the switch 140 in such a manner that the control signal is output through a direct connection control line from the AON GPIO port of the controller 180 to a control terminal of the switching device 141.

Thus, the control signal of the switch 140 is not dependent on the power mode of the tuner 120 and makes it possible to perform independent control.

In other words, the broadcast signal receiving apparatus 100 according to an exemplary embodiment is designed to perform power on/off sequence control regardless of the power control based on the operation mode. Therefore, the on/off delay control for the tuner 110 and the switch 140 is performed regardless of the operation mode.

Figure 7:
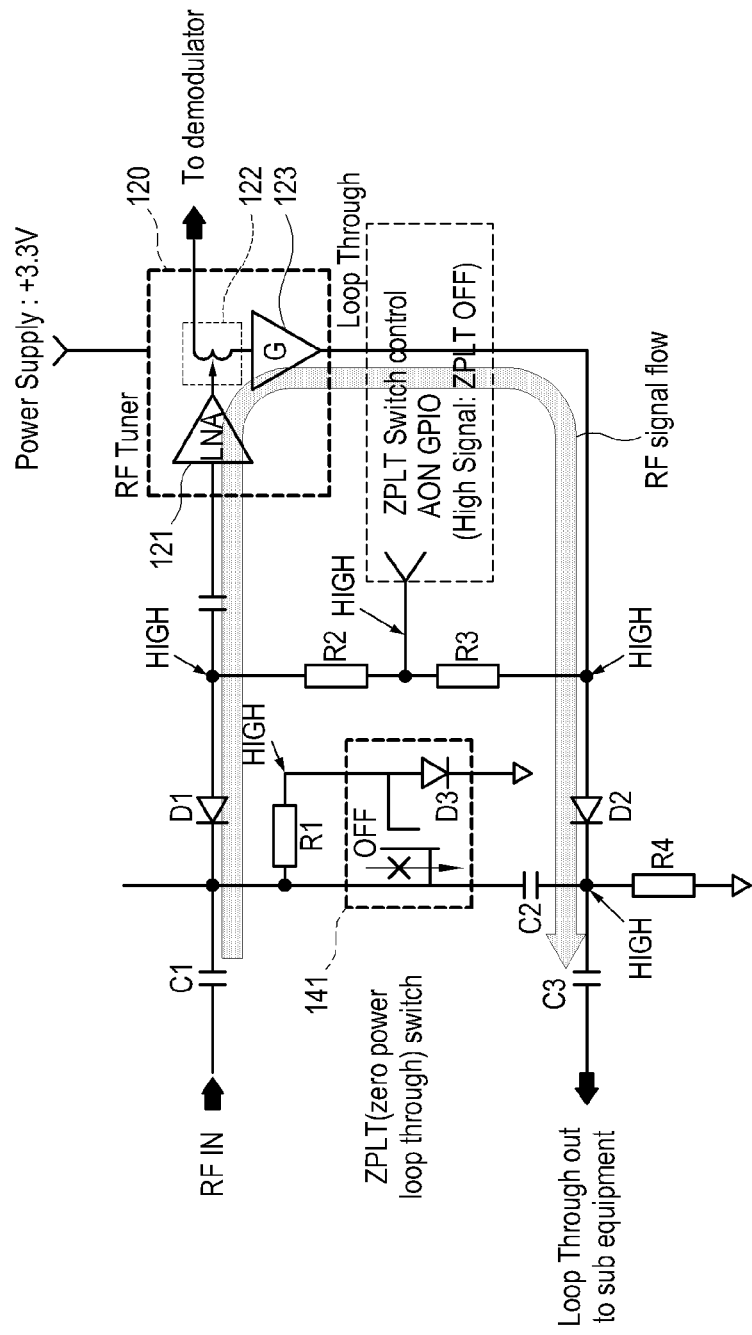
FIG. 7 and FIG. 8 are circuit diagrams showing a loop-through process of a broadcast signal in accordance with operation modes in the broadcast signal receiving apparatus of FIG. 4.
Figure 8:
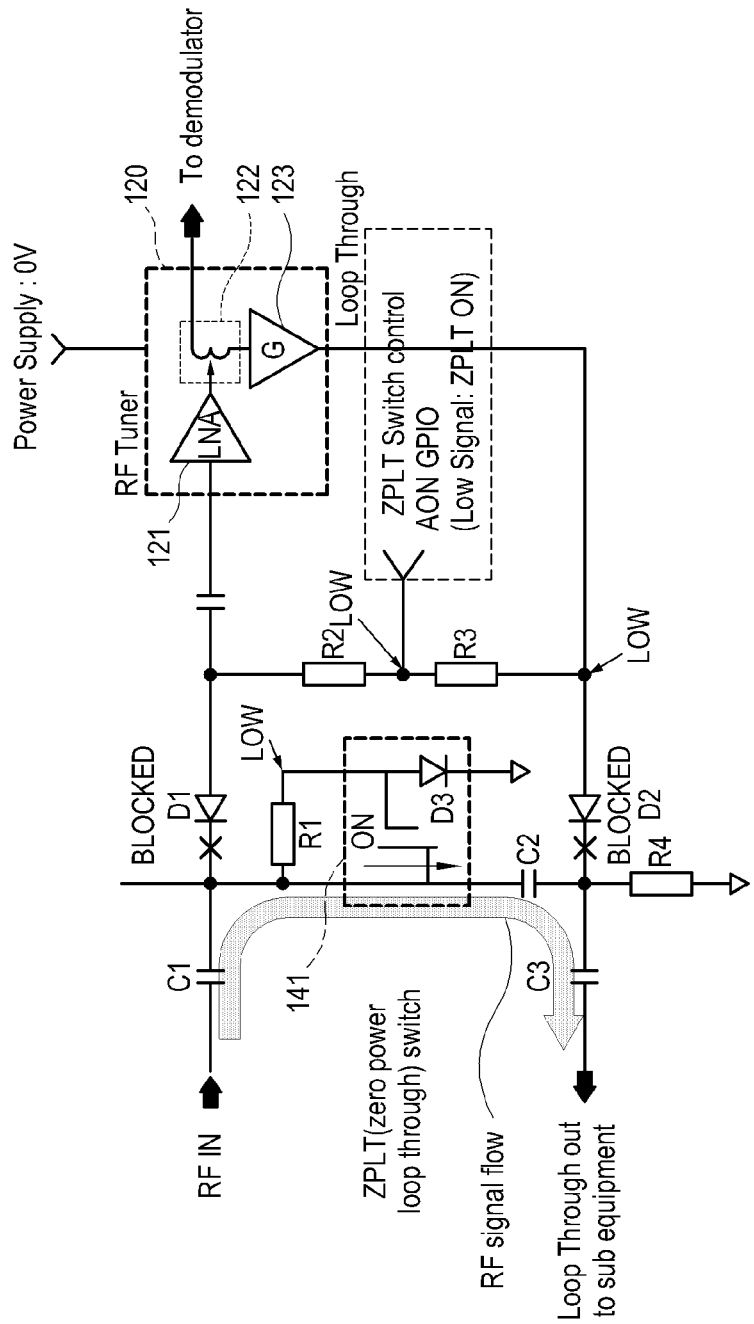

FIG. 7 and FIG. 8 are circuit diagrams showing a loop-through process of a broadcast signal in accordance with operation modes in the broadcast signal receiving apparatus of FIG. 4.

As shown in FIG. 7 and FIG. 8, the switch 140 includes the switching device 141 connected to an input terminal RF IN from a node between a capacitor C1 and a diode D1 and connected to an output terminal Loop Through out from a node between a capacitor C2 and a diode D2. For example, the capacitors C1 and C2 may be DC blocking capacitors, and the diodes D1 and D2 may be band-switching diodes.

The switching device 141 of the switch 140 may be achieved by a field effect transistor (FET) which includes the gate terminal (i.e. the control terminal) to receive the control signal, the drain terminal connected to the signal receiver 110, and the source terminal connected to the external apparatus 200. According to an exemplary embodiment, the switching device 141 is also called a zero power loop-through (ZPLT) switch. Further, the switch 140 further includes resistors R1, R2 and R3, a capacitor C2 and a diode D3, which are connected to the switching device 141, and a control voltage may be applied to the diodes D1 and D2 via the resistors R2 and R3.

The switching device 141 receives an input control signal from the AON GPIO port of the controller 180 through the control terminal. The switching device 141 is turned on, e.g., closed when the input control signal has a low level, and turned off, e.g., opened when the input control signal has a high level.

The switching device 141 is turned off in the normal mode to cut off the broadcast signal received from the signal receiver 110, and turned on in the standby mode to loop through and output the broadcast signal received from the signal receiver 110 to the external apparatus 300.

Specifically, as shown in FIG. 7, the switching device 141 is turned off in the normal mode as a high signal is applied to the gate terminal of the switching device 141 connected to the signal receiver 110, thereby blocking the broadcast signal received in the signal receiver 110.

On the other hand, the broadcast signal received in the signal receiver 110 is input to the low noise amplifier 121 of the tuner 120 via the capacitor C1 and the diode D1.

The broadcast signal input as described above undergoes the low-noise amplification through the low noise amplifier 121, and is then split by the splitter 122. The splitter 122 splits the low-noise amplified broadcast signal into a first signal (e.g., the first broadcast signal) to be output to the demodulator 131 and a second signal (e.g., the second broadcast signal) to be output to the loop-through route provider 123. The broadcast signal output to the loop-through route provider 123 is output to the external apparatus 300 via the diode D2 and the capacitor C3.

The circuits shown in FIG. 7 and FIG. 8, which include the switching diodes D1 and D2 and the low noise amplifier 121, may be specially designed to receive broadcast signals of TV channels having a bandwidth of for example 48 MHz-858 MHz, and such a kind of circuit elements may be for example used in television sets and video recorders.

The loop-through route provider 123, coupling the signal output from the splitter 122 with the output to the external apparatus 300, corresponds to the active loop-through that operates when the power is supplied to the tuner 120 and the tuner 120 is turned on, at which the switching diodes D1 and D2 are all forward-biased to allow the broadcast signal to pass therethrough. Thus, the switching diodes D1 and D2 may operate in the ON-mode as very small resistors that give little attenuation.

By the way, the broadcast signal receiving apparatus 100 may be converted from the normal mode to the standby mode if at least one mode conversion condition such as a user's input using the power button is satisfied while operating in the normal mode.

As shown in FIG. 8, if the broadcast signal receiving apparatus 100 is converted from the normal mode to the standby mode, a low signal is transmitted from the AON GPIO port of the controller 180 to the gate terminal of the switching device 141, thereby turning on the switch 140.

If the first setting time elapses from turning on the switch 140, the controller 180 cuts off power supplied to the tuner 120. Here, the first setting time, during which the power-off of the tuner 120 is delayed, is previously set to completely turn on the switch 140 so that the broadcast signal can be transmitted without loss.

Figure 9:
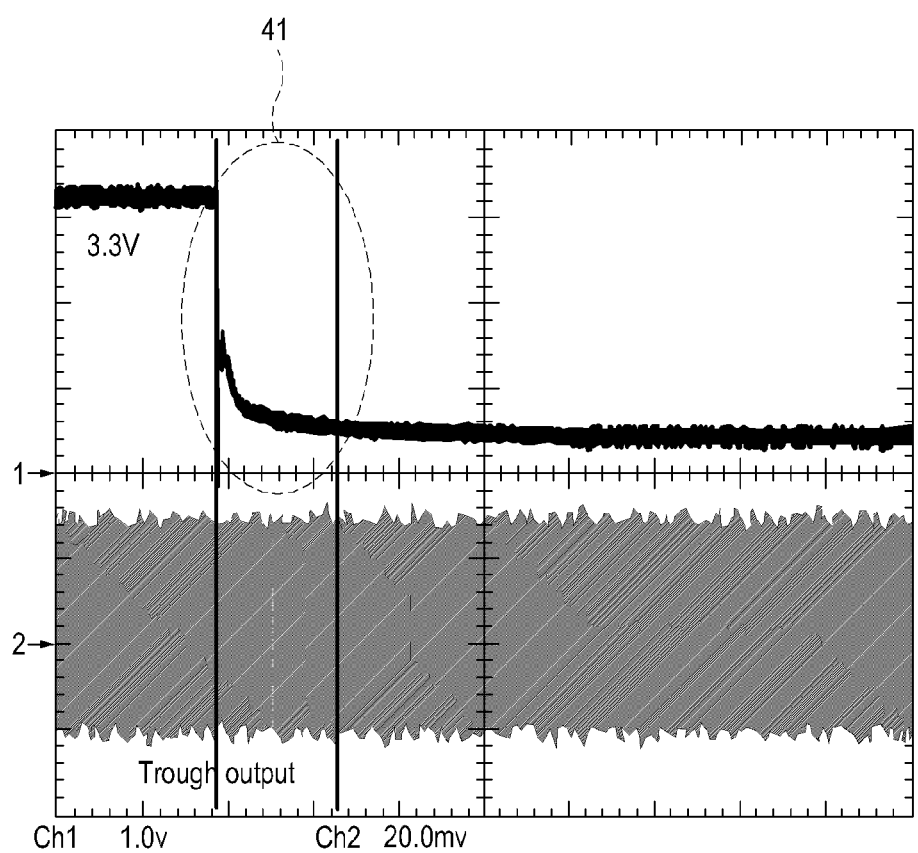
FIG. 9 and FIG. 10 show examples where a broadcast signal is distorted in a conventional broadcast signal receiving apparatus.
Figure 10:
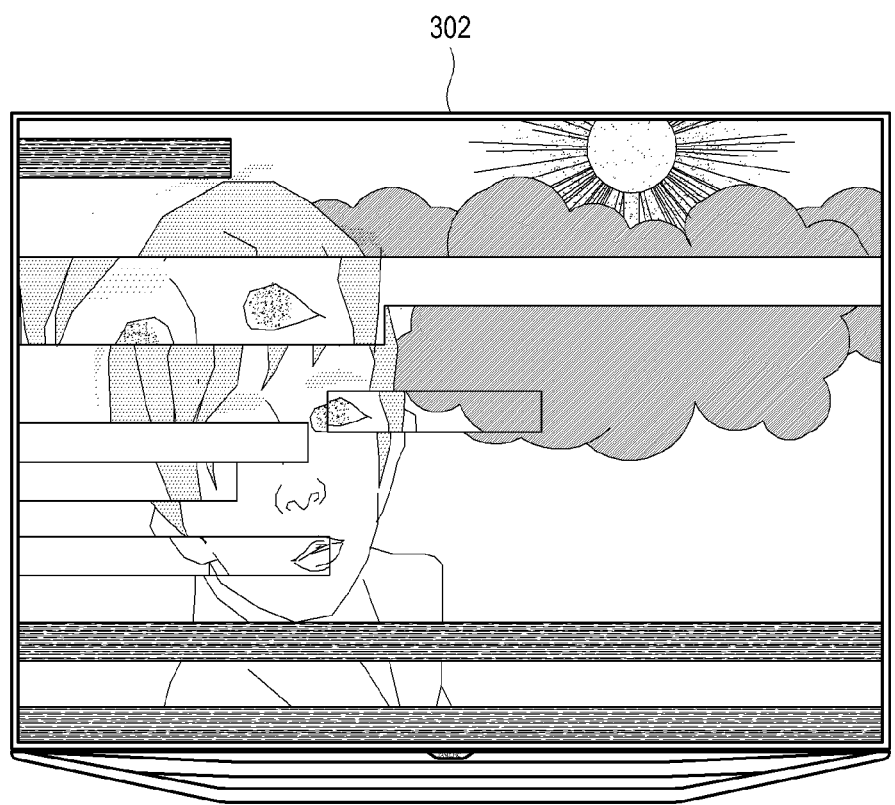
Figure 11:
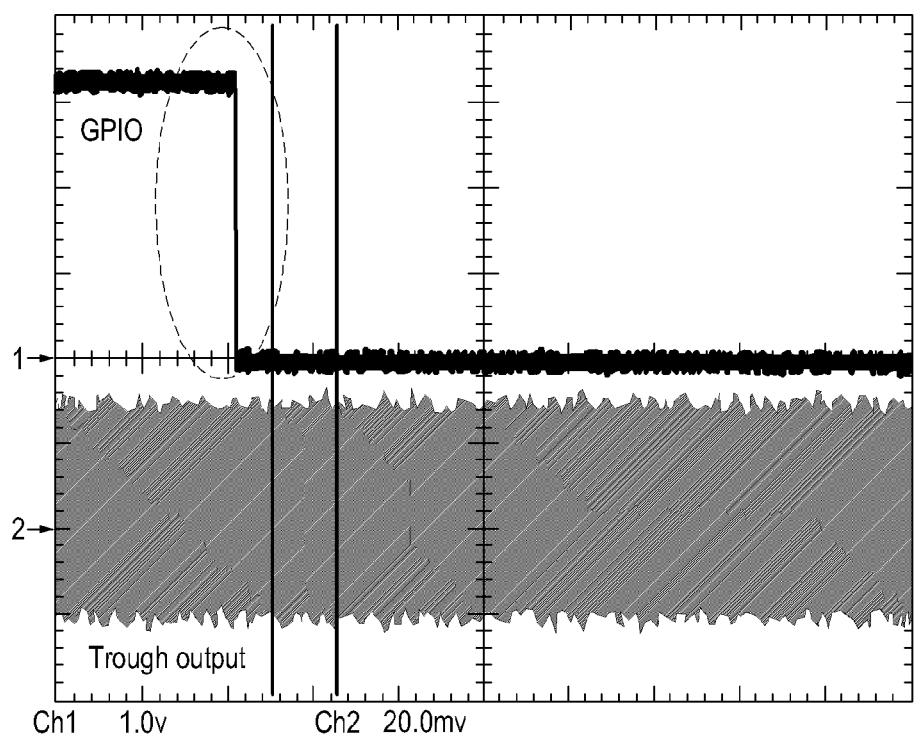
FIG. 11 shows an example that distortion of a broadcast signal is reduced in the broadcast signal receiving apparatus according to an exemplary embodiment.

FIG. 9 and FIG. 10 show examples where a broadcast signal is distorted in a conventional broadcast signal receiving apparatus, and FIG. 11 shows an example that distortion of a broadcast signal is reduced in the broadcast signal receiving apparatus according to an exemplary embodiment.

If the switch 140 is turned on and at the same time the tuner 120 is powered off as the normal mode is converted to the standby mode, there may be a delay section 41 taken in completely turning off the tuner 120 as shown in FIG. 9.

Hence, the switching device 141 is not completely turned on and there is timing during which the loop-through signal becomes weak, a macroblock phenomenon, where the broadcast signal is distorted, occurs in the external apparatus 300 as shown in FIG. 10. Further, when the switching device 141 is switched from off to on, a timing delay may be caused by circuit elements that constitute the switch 140, i.e. a RC time constant, delay noise due to switching operation, etc.

Referring to FIG. 9, the delay section 41 is about 20 ms. If 20 ms elapses from turning on the switch 140, there is no distortion in the broadcast signal of the external apparatus 300. Therefore, the first setting time is set to 20 ms.

If the first setting time elapses from turning on the switch 140, the controller 180 cuts off the power supplied to the tuner 120. Thus, when the tuner 130 is turned off, the diode D1 blocks the broadcast signal transmitted to the tuner 120 as shown in FIG. 8.

In addition, the loop-through route is changed as shown in FIG. 8 so that the broadcast signal received in the signal receiver 110 can be output to the external apparatus 300 through the switch 140. That is, the broadcast signal received from the signal receiver 110 is output to the external apparatus 300 via the drain terminal and the source terminal of the switching device 141, and the switching device 141 corresponds to the passive loop-through. Here, the broadcast signal output from the switch 140 is blocked by the diode D2 and thus entirely output to the external apparatus 300 without loss.

In the broadcast signal receiving apparatus 100 according to an exemplary embodiment, the power supplied to the tuner 120 is cut off after the first setting time elapses from turning on the switch 140 in response to the conversion into the standby mode, and therefore there is no distortion in the signal as shown in FIG. 11.

According to an exemplary embodiment, the broadcast signal receiving apparatus 100 may be converted from the standby mode to the normal mode as at least one mode conversion condition such as a user's input using the power button is satisfied while operating in the standby mode.

If the broadcast signal receiving apparatus 100 is converted from the standby mode to the normal mode, the tuner 120 receives power and is turned on, the loop-through function (e.g., the active loop-through) of the tuner 120 is activated.

The controller 180 applies the high signal to the gate terminal of the switching device 141 through the AON GPIO port and thus turns off the switch 140 when the second setting time elapses from turning on the tuner 120.

Here, the second setting time, which is delayed until the control signal applied to the switch 140 is changed from a low level to a high level, is previously set in consideration of a delay time taken in making the power reach a critical level or higher at which the loop-through function of the tuner 120 normally operates. In this exemplary embodiment, the second setting time may be set to 10 ms.

If the second setting time elapses from turning on the tuner 120, the controller 180 changes the control signal, which is input to the control terminal of the switching device 141 through the AON GPIO port, from the high level to the low level. Thus, when the switching device 141 is completely turned off, the broadcast signal transmitted to the switch 140 is cut off as shown in FIG. 7.

Further, the loop-through route is changed as shown in FIG. 7 so that the broadcast signal received from the signal receiver 110 via the diode D1 can be output to the external apparatus 300 through the tuner 120. That is, the broadcast signal received in the signal receiver 110 is output to the external apparatus 300 via the low noise amplifier 121, the loop-through route provider 123 and the diode D2.

In the broadcast signal receiving apparatus 100 according to an exemplary embodiment, the controller 180 turns off the switch 140 after the second setting time elapses from turning on the tuner 120 in response to the conversion to the normal mode, and thus there is no loss/distortion of the signal in the external apparatus 300.

In the broadcast signal receiving apparatus 100 according to an exemplary embodiment, the active loop-through function provided by the tuner 120 has better noise performance than the passive loop-through function which is via the switch 140 since the input broadcast signal in the active loop-through function is amplified by the low-noise amplifier 121 and sent to the loop-through output terminal via the loop-through route provider 123 without loss.

In the foregoing exemplary embodiment, the first setting time and the second setting time are previously set in consideration of a possibility of distorting a signal while turning on/off the tuner 120 and the switch 140, but not limited thereto.

That is, the controller 180 determines whether an element turned on after converting the operation mode, for example the loop-through function of the tuner 110 after conversion into the normal mode, operates normally, and thus turns off the other elements, for example the switch 140, in accordance with the determination results. Here, the tuner 120 and the switch 140 may output control signals, which respectively indicate whether they operate normally, to the controller 180.

Further, the first setting time and the second setting time are not respectively limited to 20 ms and 10 ms, and may vary depending on system environments. For example, the first setting time to be taken in completely turning on the switch 140 may be varied depending on characteristics of elements such as R and C that constitute the circuit of the switch 140.

Further, the first setting time and/or the second setting time may be varied depending on channel frequencies of the broadcast signal. Besides, like the following embodiments shown in FIG. 14, the first setting time and/or the second setting time may be set/modified in accordance with a user's selection.

Figure 12:
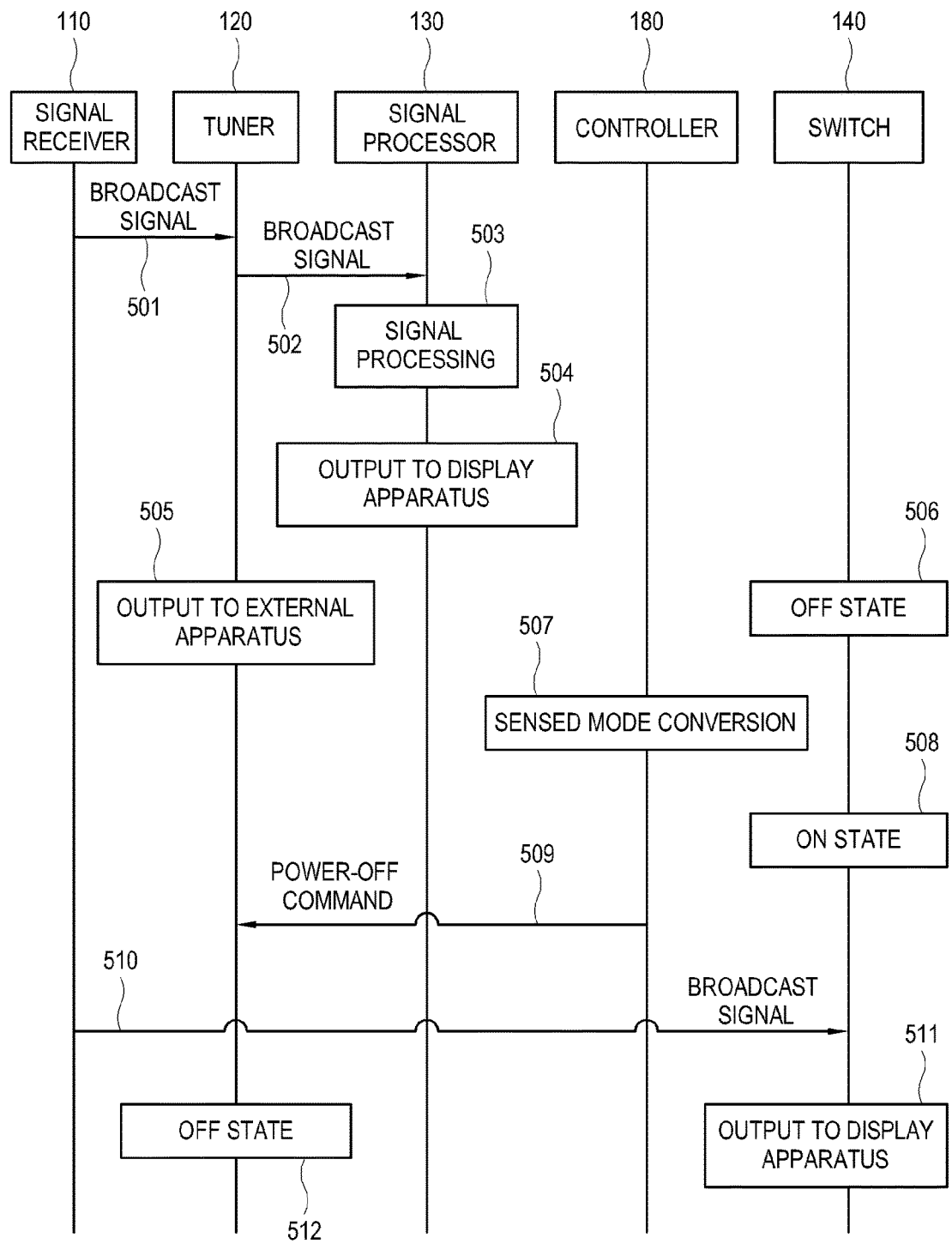
FIG. 12 shows processes of changing a loop-through route of a broadcast signal is changed in accordance with conversion from a normal mode to a standby mode in the broadcast signal receiving apparatus according to an exemplary embodiment.
Figure 13:
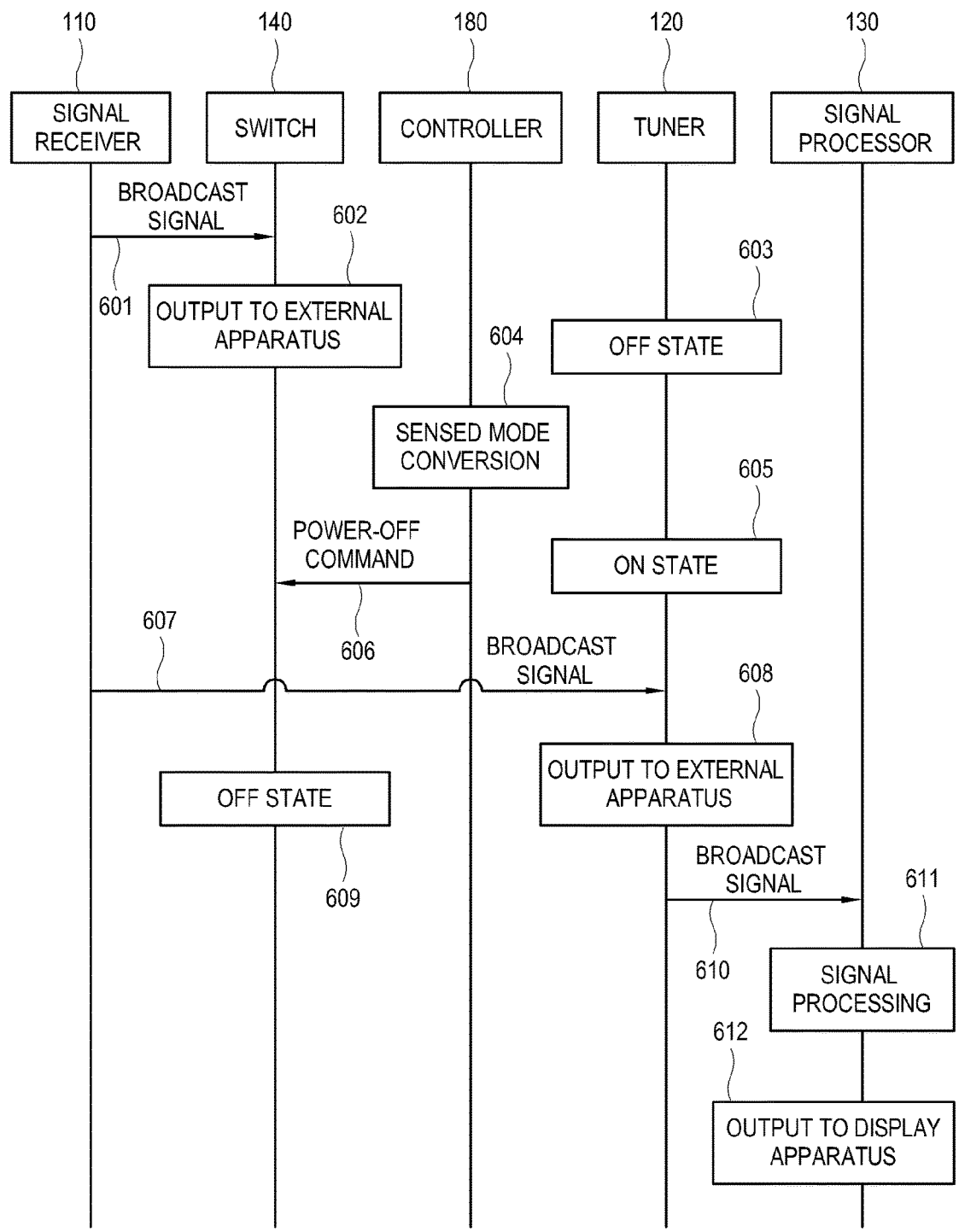
FIG. 13 shows processes of changing a loop-through route of a broadcast signal is changed in accordance with conversion from the standby mode to the normal mode in the broadcast signal receiving apparatus according to an exemplary embodiment.

FIG. 12 shows processes of changing a loop-through route of a broadcast signal that is changed in accordance with conversion from a normal mode to a standby mode in the broadcast signal receiving apparatus according to an exemplary embodiment, and FIG. 13 shows processes of changing a loop-through route of a broadcast signal that is changed in accordance with conversion from the standby mode to the normal mode in the broadcast signal receiving apparatus according to an exemplary embodiment.

As shown in FIG. 12, in the broadcast signal receiving apparatus 100 operating in the normal mode, the signal receiver 110 receives the broadcast signal and sends it to the tuner 120 (501). Here, the broadcast signal receiving apparatus 100 may operate by entering the normal mode through a mode conversion process to be described later with reference to FIG. 13.

The tuner 120 amplifies the received broadcast signal by the low noise amplifier 121, and splits the amplified broadcast signal into a first broadcast signal and a second broadcast signal by the splitter 122. Further, the split first broadcast signal is output to the signal processor 130 (502).

The signal processor 130 processes the first broadcast signal in accordance with various image processing processes (503), and outputs the processed first broadcast signal to the display apparatus (504).

Further, the second broadcast signal split by the splitter 122 is output to the external apparatus 300 through the loop-through route provider 123 of the tuner 120 (505). Here, the switch 140 continuously maintains the off state where the high signal is applied (506).

Here, the controller 180 can detect the mode conversion, e.g., a command for conversion from the normal mode to the standby mode (507). For example, the controller 180 senses a user's control of the power button of the user input device 150 in the normal mode and determines that a command for mode conversion is issued.

In response to the detection of the mode conversion, the controller 180 transmits the low signal to the switching device 141 of the switch 140 through the AON GPIO port. The switching device 141 is turned on by receiving the low signal from the AON GPIO port through the control terminal (508).

If the first setting time elapses from turning on the switching device 141, the controller 180 outputs a command for turning off the tuner 120 (509). Then, the power supplied from the power supply 170 to the tuner 120 is cut off.

Since the low noise amplifier 121 of the tuner 120 becomes turned off, the broadcast signal received in the signal receiver 110 is blocked by the diode D1 with regard to the route toward the tuner 120, and thus transmitted to the switch 140 (510).

Through the loop-through route formed by the switch 140, the broadcast signal is output to the external apparatus 300 (511). Here, the tuner 120 maintains the off state (512).

The broadcast signal receiving apparatus 100 according to an exemplary embodiment turns on the switch 140 in response to the conversion from the normal mode to the standby mode as shown in FIG. 12, and turns off the tuner 120 after the first setting time elapses from turning on the switch 140, thereby preventing the loss/distortion of the broadcast signal looped through to the external apparatus 300.

As shown in FIG. 13, in the broadcast signal receiving apparatus 100 operating in the standby mode, the broadcast signal received in the signal receiver 110 is output to the switch 140 (601). Here, the broadcast signal receiving apparatus 100 may operate by entering the standby mode through the mode conversion process described with reference to FIG. 12.

Then, the broadcast signal is output, e.g., looped through to the external apparatus 300 through the switch 140 (602).

Here, the tuner 120 maintains the off state (603). That is, since the low noise amplifier 121 of the tuner 120 is in the off state, the broadcast signal received in the signal receiver 110 is blocked by the diode D1 with regard to the route toward the tuner 120, and thus transmitted to the switch 140 and output to the external apparatus 300.

The controller 180 can detect the mode conversion from a user, e.g., a command for conversion from the standby mode to the normal mode (604). For example, the controller 180 senses a user's control of the power button of the user input device 150 in the standby mode and determines that a command for mode conversion is issued.

In response to the detection of the mode conversion, the controller 180 outputs a command for turning on the tuner 120. Thus, the power supply 170 supplies power to the tuner 120, thereby turning on the tuner 120 (605).

If the second setting time elapses from turning on the tuner 120, the controller 180 issues a command for turning off the switching device 141 of the switch 140, e.g., transmits a high signal to the switching device 141 of the switch 140 through the AON GPIO port (606). Thus, the switching device 141 is turned off by receiving the high signal from AON GPIO port through the control terminal.

Here, the broadcast signal received in the signal receiver 110 is transmitted to the tuner 120 (607). Then, the loop-through route is formed via the tuner 120, so that the broadcast signal, e.g., the second broadcast signal can be output to the external apparatus 300 through the loop-through route provider 123 (608).

Here, the switch 140 continuously maintains the off state where the high signal is applied (609).

The tuner 120 amplifies the received broadcast signal by the low noise amplifier 121, and splits the amplified broadcast signal into the first broadcast signal and the second broadcast signal by the splitter 122. Further, the split first broadcast signal is output to the signal processor 130 (610).

Further, the signal processor 130 processes the first broadcast signal in accordance with various image processing processes (611), and outputs the processed first broadcast signal to the display apparatus (612).

In the broadcast signal receiving apparatus 100 according to an exemplary embodiment, the switch 140 is turned off after the second setting time elapses from turning on the tuner 120 even in the conversion from the standby mode to the normal mode as shown in FIG. 12, so that the broadcast signal can be looped through to the external apparatus 300 without loss/distortion.

Thus, no macroblock phenomenon occurs due to distortion/loss of the broadcast signal in the external apparatus 300, e.g., the sub apparatus, when the operation mode is converted.

By the way, it will be described that the first setting time and the second setting time are set by a user's selection.

Figure 14:
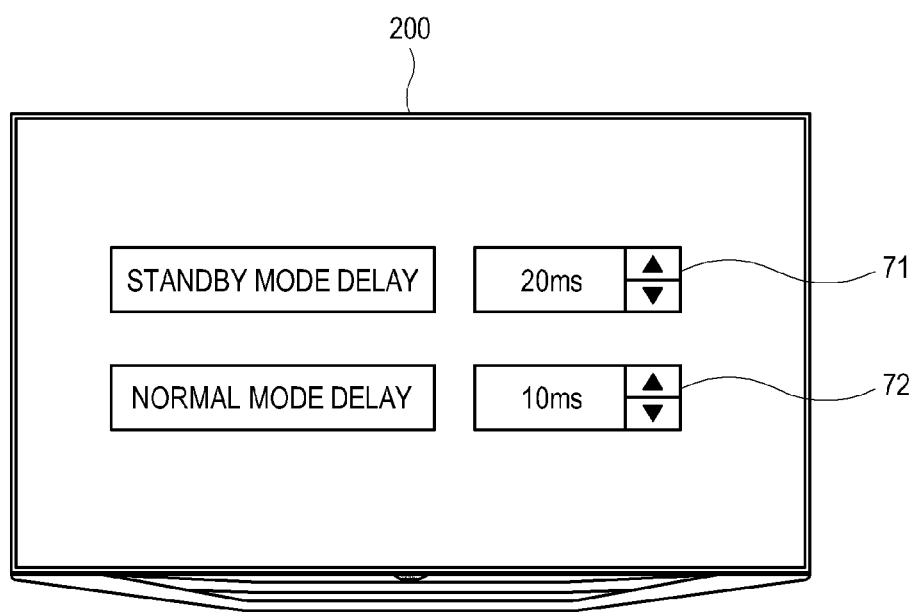
FIG. 14 shows an example of a screen for setting a delay time in the broadcast signal receiving apparatus according to an exemplary embodiment.
Figure 15:
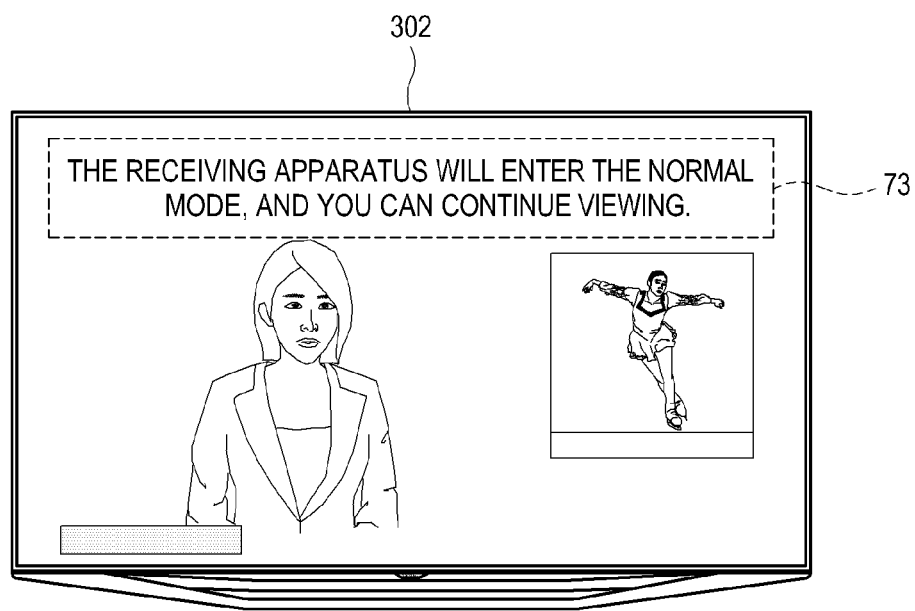
FIG. 15 shows an example of a message displayed on the screen when the operation mode is converted in the broadcast signal receiving apparatus according to an exemplary embodiment.

FIG. 14 shows an example of a screen for setting a delay time in the broadcast signal receiving apparatus according to an exemplary embodiment, and FIG. 15 shows an example of a message displayed on the screen when the operation mode is converted in the broadcast signal receiving apparatus according to an exemplary embodiment;

As shown in FIG. 14, the display apparatus 200 may display a user interface (UI) 71 through which a delay time taken in turning off the tuner 120 when the normal mode is converted into the standby mode, e.g., the first setting time can be set, and a UI 72 through which a delay time taken in turning off the switch 140 when the standby mode is converted into the normal mode, e.g., the second switching time can be set.

Thus, a user may use the user input device 150 to set the first setting time or the second setting time by increasing or decreasing their defaults through the UIs 71 and 72.

FIG. 14 shows that the defaults of the first setting time and the second setting time are 20 ms and 10 ms, respectively. However, this is nothing but an example. Alternatively, the defaults may be set differently.

Further, the UIs 71 and 72 of FIG. 14 may be displayed on the sub display apparatus 302 connected to an external apparatus 303 achieved by the display apparatus as shown in FIG. 3 or an external apparatus achieved by a set-top box 301.

Thus, a user may use the user input to set the first setting time or the second setting time by his/her input with regard to the UIs displayed on the corresponding display apparatuses 302 and 303.

As there is provided a UI through which the first setting time and/or the second setting time applied when the operation mode is converted is adjustable, it is thus possible to do adaptive control in accordance with system environments, a user's tastes, etc.

As shown in FIG. 12, the case where the broadcast signal receiving apparatus 100 is converted from the normal mode to the standby mode may include a case where a user stops viewing a broadcast through the display apparatus 200 and another user continues to view the broadcast through the external apparatus 300.

In this case, a message 73 informing that normal viewing is possible may be displayed in the sub display apparatus 302 connected to an external apparatus 303 achieved by the display apparatus as shown in FIG. 3 or an external apparatus achieved by a set-top box 301.

Through the displayed message 73, a user may check that the broadcast of the main display apparatus 200 is interrupted. As necessary, if a user feels inconvenience in viewing a broadcast, s/he may change the delay time through the UIs 71 and 72 as shown in FIG. 14.

FIG. 15 shows the message 73 displayed when the broadcast signal receiving apparatus 100 is converted from the normal mode into the standby mode. On the contrary, even when the broadcast signal receiving apparatus 100 is converted from the standby mode into the normal mode, a predetermined message, for example, "the receiving apparatus will enter the normal mode, and you can continue viewing," may be displayed on at least one of the display apparatuses 200, 302 and 303.

Here, the displayed message may be variously set without being limited to the foregoing example shown in FIG. 15.

In the foregoing embodiment described with reference to FIG. 15, a predetermined message is displayed when the operation mode is converted, but not limited thereto. As necessary, a previously stored black screen may be displayed during the delay time so as to minimize a user's visual inconvenience caused while changing the loop-through route.

That is, while the loop-through route is changed due to the conversion of the operation mode in the broadcast signal receiving apparatus 100 according to an exemplary embodiment, it is possible to give various effects so that a user who is viewing a broadcast screen through the external apparatus 300 cannot experience a broadcast-screen crack or other visual/acoustic inconveniences.

Figure 16:
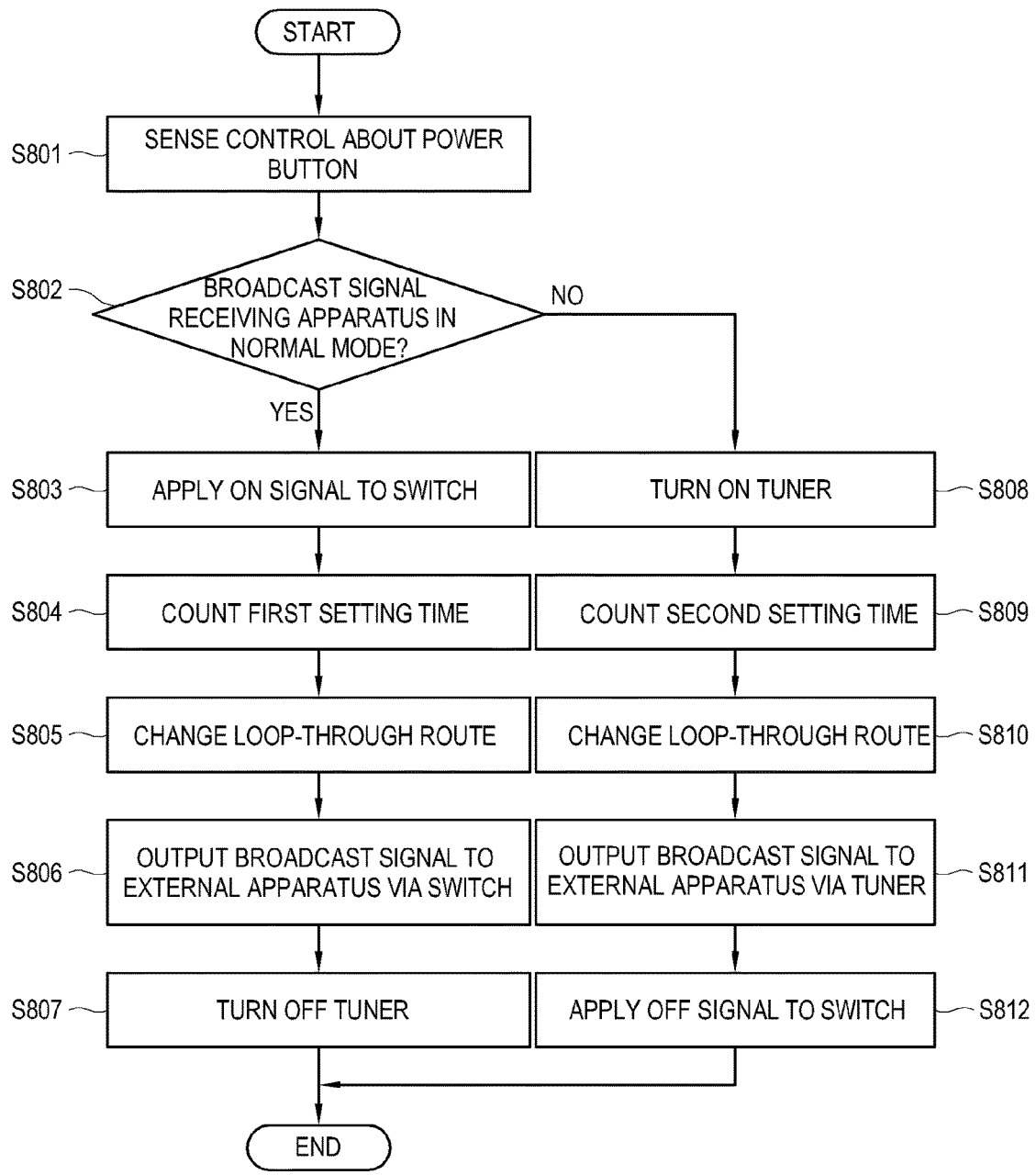
FIG. 16 is a flowchart showing a method of controlling the broadcast signal receiving apparatus according to an exemplary embodiment.

Below, a method of controlling the broadcast signal receiving apparatus according to an exemplary embodiment will be described with reference to accompanying drawings FIG. 16 is a flowchart showing a method of controlling the broadcast signal receiving apparatus according to an exemplary embodiment.

As shown in FIG. 16, the controller 180 may detect a user's control, e.g., may detect an actuation of or a push of the power button provided in the user input device 150 of the broadcast signal receiving apparatus 100 (S801).

The controller 180 determines whether the control of the power button is received while the broadcast signal receiving apparatus 100 is in the normal mode (S802).

If it is determined in the operation S802 that the control is received in the normal mode, an 'ON' signal is applied to the switch 140 (S803). As the control signal applied from the AON GPIO port of the controller 180 to the control terminal of the switching device 141 is changed from 'high' to 'low', the switching device 141 may be turned on.

If the switch 140 is turned on in operation S803, the controller 180 counts the first setting time (for example, 20 ms) delayed until the tuner 120 is turned off (S804).

As a result of counting the time in operation S804, if the first setting time elapses from turning on the switch 140, the broadcast signal flowing toward the tuner 120 is blocked by the diode D1 and connected to the switching device 141 of the switch 140, thereby changing the loop-through route (S805).

The broadcast signal is output to the external apparatus 300 through the loop-through route changed in the operation S805, e.g., through the switch 140 (S806). Thus, the RF broadcast signal flows from the broadcast signal receiving apparatus 110 to the external apparatus 300 through the switching device 141 (the passive loop-through).

Further, the controller 180 cuts off the power supplied from the power supply 170 to the tuner 120. Thus, the tuner 120 becomes turned off (S807).

As described, since the broadcast signal is looped through by the switch 140 and the tuner 120 becomes turned off after the switching device 141 is sufficiently turned on by delaying the first setting time from turning on the switch 140, the loop-through signal is wholly output to the external apparatus 300 without distortion or loss, thereby preventing the macroblock phenomenon.

On the other hand, if it is determined in operation S802 that a user's control is not received in the normal mode, e.g., a user's control is received in the standby mode, the tuner 120 is turned on under control of the controller 180 (S808).

If the tuner 120 is turned on in operation S803, the controller 180 counts the second setting time (for example, 10 ms) delayed until the switch 140 becomes turned off (S809).

As a counting result in the operation S809, if the second setting time elapses after turning on the tuner 120, the broadcast signal flowing toward the tuner 120 is connected by the diode D1 and the switching device 141 of the switch 140 is blocked, thereby changing the loop-through route (S810).

The broadcast signal is output to the external apparatus 300 via the loop-through route changed in operation S809, e.g., through the loop-through route provider 132 of the tuner 120 (S811). Thus, the RF broadcast signal flows from the broadcast signal receiving apparatus 110 to the external apparatus 300 via the tuner 120 (the active loop-through).

Further, the control signal applied from the AON GPIO port of the controller 180 to the control terminal of the switching device 141 is changed from low to high, and thus the switching device 141 becomes turned off (S812).

Like this, since the broadcast signal is looped through by the tuner 120 and the switch 140 becomes turned off after the tuner 120 is sufficiently turned on by delaying the second setting time from turning on the tuner 120, the loop-through signal is wholly output to the external apparatus 300 without distortion or loss, thereby preventing the macroblock phenomenon.

By the way, the broadcast signal receiving apparatus 100 according to an exemplary embodiment may be configured to make the broadcast signal be looped through to a plurality of external apparatuses.

Figure 17:
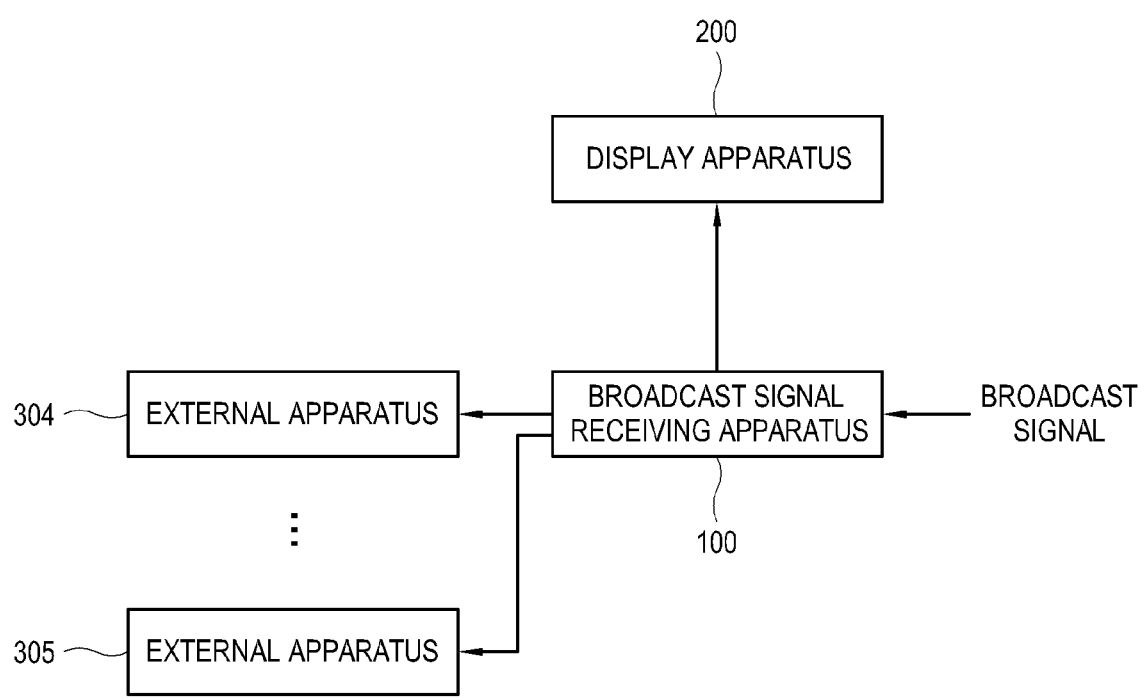
FIG. 17 is a block diagram showing a system that includes a broadcast signal receiving apparatus, a display apparatus and a plurality of external apparatuses according to an exemplary embodiment.

FIG. 17 is a block diagram showing a system that includes a broadcast signal receiving apparatus, a display apparatus and a plurality of external apparatuses according to an exemplary embodiment.

As shown in FIG. 17, the broadcast signal receiving apparatus 100 may output a broadcast signal received from the signal source to two or more external apparatuses 304 and 305 other than the display apparatus 200 provided as the main apparatus for displaying an image.

The broadcast signal receiving apparatus 100 may be provided with a plurality of output terminals which are branched from the switch for providing the loop-through route toward each of the external apparatuses 304 and 305 so that the broadcast signal can be output to the plurality of external apparatuses 304 and 305 in the standby mode.

As necessary, the broadcast signal receiving apparatus 100 may be provided with a plurality of switches corresponding to the external apparatuses 304 and 305 so that the broadcast signal can be provided to each of the external apparatuses in the standby mode.

According to an exemplary embodiment, even when the broadcast signal is looped through to the plurality of external apparatuses 304 and 305, the loop-through route alternates between the tuner and the switch in response to the operation mode of the broadcast signal receiving apparatus 100, and the tuner or the switch is turned off after delaying a predetermined period of time after changing the operation mode, thereby preventing the broadcast signal from being distorted/lost in the external apparatus 304 or 305.

As described above, according to exemplary embodiments, the controller 180 directly controls the switch 140 to be turned on/off in such a manner that the control signal is output to the control terminal of the switch 140 through a part of the CPU or the AON GPIO port of the microcomputer, which can normally operate regardless of the operation mode of the broadcast signal receiving apparatus 100, thereby having an advantage of controlling the switch 140 independently of the power-on/off of the broadcast signal receiving apparatus 100.

Further, a sequence is controlled through delay between on/off of the switch 140 and loop-through on/off in the tuner 120 when the operation mode is converted in the broadcast signal receiving apparatus 100, thereby having effects on preventing a screen crack, e.g., a macroblock phenomenon in the external apparatus 300 with regard to the loop-through broadcast signal.

Specifically, at the conversion from the normal mode to the standby mode, an ON signal is applied to the switch 140 and the tuner 120 is turned off after the switching device 141 is sufficiently turned on, so that the broadcast signal can be output, e.g., looped through to the external apparatus 300 via the switch 140, thereby wholly transmitting the broadcast signal to the external apparatus 300 without distortion or loss.

In addition, at the conversion from the standby mode to the normal mode, the switch 140 is turned off after the tuner 120 is supplied with power and changed into a state for normal operation, so that the broadcast signal can be output, e.g., looped through to the external apparatus 300 via the tuner 120, thereby wholly transmitting the broadcast signal to the external apparatus 300 without distortion or loss.

By the way, the foregoing exemplary embodiments may be achieved by a computer-readable recording medium. The computer-readable recording medium includes a transmission medium and a storage medium for storing data readable by a computer system. The transmission medium may be achieved by a wired/wireless network where computer systems are connected to one another.

The foregoing exemplary embodiments may be achieved by hardware and combination of hardware and software. The hardware includes the controller 180, and the controller 170 includes a nonvolatile memory where the software, i.e. a computer program is stored; a random access memory (RAM) to which the computer program stored in the nonvolatile memory is loaded; and a central processing unit (CPU) for executing the computer program loaded to the RAM. The nonvolatile memory may include a hard disk drive, a flash memory, a read only memory (ROM), compact disc (CD)-ROMs, magnetic tapes, a floppy disk, an optical storage, a data transmission device using Internet, etc., but not limited thereto. The nonvolatile memory is just an example of the computer-readable recording medium in which a program readable by a computer is recorded.

The computer program is a code that can be read and executed by the CPU, and includes codes for enabling the controller 180 to perform operations including the operations 501 to 512 of FIG. 12, the operations 601 to 612 of FIG. 13, and the operations S801 to S812 of FIG. 16.

The computer program may be involved in software including an operating system or applications provided in the broadcast signal receiving apparatus 100 and/or software interfacing with the external apparatus.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A broadcast signal receiving apparatus comprising:
   a tuner to:
      receive a broadcast signal from a signal source corresponding to a selected channel when the broadcast signal receiving apparatus is in a normal mode, and
      provide the received broadcast signal to an external apparatus,
      wherein the tuner provides the received broadcast signal to the external apparatus without providing the received broadcast signal via a switch,
   the tuner comprising:
      a splitter to split the received broadcast signal into a first broadcast signal to be displayed on a display apparatus and a second broadcast signal to be looped through to the external apparatus; and
      a loop-through route provider to loop through the second broadcast signal split by the splitter to the external apparatus;

the switch, in response to receiving a control signal directly from a controller that is directly connected to the tuner and the switch, to be turned on or off corresponding to an operation mode of the broadcast signal receiving apparatus, the operation mode including the normal mode and a standby mode; and the controller to:

in response to the broadcast signal receiving apparatus entering the standby mode, turn on the switch by the control signal to route the received broadcast signal through the switch, excluding the tuner, to the external apparatus, and cut off power supplied to the tuner after elapsing of a first setting time which starts in response to entering of the standby mode, wherein the elapsing of a first setting time is determined for the switch to completely turn on in response to entering the standby mode, and in response to elapsing of a second setting time which starts in response to the broadcast signal receiving apparatus entering in the normal mode, turn off the switch to route the received broadcast signal through the tuner, to the external apparatus.

2. The broadcast signal receiving apparatus according to claim 1, wherein the first setting time and the second setting time are determined by at least one of characteristics of circuit elements that constitute the switch, delay noise caused when the switch is turned on or off, and an operation delay caused when power is supplied to or cut off from the tuner.

3. The broadcast signal receiving apparatus according to claim 1, wherein the controller outputs the control signal for turning on or off the switch through an always-on general purpose input/output (AON GPIO) port.

4. The broadcast signal receiving apparatus according to claim 3, wherein the switch is turned on if the control signal received through the AON GPIO port has a low level, and is turned off if the control signal has a high level.

5. The broadcast signal receiving apparatus according to claim 3, wherein the switch comprises a gate terminal to receive the control signal, a drain terminal connecting with a signal receiver for receiving the broadcast signal, and a source terminal connecting with the external apparatus and forming a loop-through route toward the external apparatus.

6. The broadcast signal receiving apparatus according to claim 1, wherein the tuner comprises a low noise amplifier to amplify the received broadcast signal to have low noise, wherein the splitter is further to split the broadcast signal received from the low noise amplifier into the first broadcast signal and the second broadcast signal.

7. The broadcast signal receiving apparatus according to claim 6, further comprising a signal processor to process the broadcast signal to be displayable on the display apparatus, wherein the first broadcast signal split by the splitter is output to the signal processor.

8. The broadcast signal receiving apparatus according to claim 1, further comprising a user input device to receive an input of a user to convert the operation mode of the broadcast signal receiving apparatus, wherein the controller converts the operation mode into the standby mode if the input of the user is received while in the normal mode, and converts the operation mode of the broadcast signal receiving apparatus into the normal mode if the input of the user is received while in the standby mode.

9. The broadcast signal receiving apparatus according to claim 1, wherein the broadcast signal receiving apparatus comprises a set-top box to output the broadcast signal to a display apparatus, and the external apparatus comprises one of a sub-display apparatus other than the display apparatus and another set-top box.

10. The broadcast signal receiving apparatus according to claim 1, wherein in response to the broadcast signal receiving apparatus entering the normal mode, the controller is to turn on the tuner without waiting for the second setting time to elapse.

11. A method of controlling a broadcast signal receiving apparatus for outputting a first broadcast signal to a display apparatus, the method comprising:

receiving a broadcast signal from a signal source corresponding to a selected channel;

providing the received broadcast signal through a tuner of the broadcast signal receiving apparatus, without providing the received broadcast signal via a switch, to an external apparatus different from the display apparatus when the broadcast signal receiving apparatus is in a normal mode; and in response to receiving a control signal directly from a controller that is directly connected to the tuner and the switch, turning on or off the switch of the broadcast signal receiving apparatus corresponding to an operation mode of the broadcast signal receiving apparatus, the operation mode including the normal mode and a standby mode, wherein the turning on or off the switch comprises:

in response to the broadcast signal receiving apparatus entering the standby mode, turning on the switch by the control signal to route the broadcast signal through the switch, which excludes the tuner, through to the external apparatus, and cutting off power supplied to the tuner after elapsing of a first setting time which starts in response to the entering of the standby mode, wherein the elapsing of a first setting time is determined for the switch to completely turn on in response to entering the standby mode; and in response to elapsing of a second setting time which starts in response to the broadcast signal receiving apparatus entering the normal mode, turning off the switch to route the broadcast signal through the tuner, to the external apparatus, wherein the providing the received broadcast signal through the tuner of the broadcast signal receiving apparatus comprises:

splitting the received broadcast signal into the first broadcast signal to be displayed on the display apparatus and a second broadcast signal to be looped through to the external apparatus; and looping through the split second broadcast signal to the external apparatus.

12. The method according to claim 11, wherein the first setting time and the second setting time are determined by at least one of characteristics of circuit elements that constitute the switch, delay noise caused when the switch is turned on or off, and an operation delay caused when power is supplied to or cut off from the tuner.

13. The method according to claim 11, wherein the turning on or off the switch comprise outputting the control signal for turning on or off the switch through an always-on general purpose input/output (AON GPIO) port of the controller.

14. The method according to claim 13, wherein the switch is turned on if the control signal received through the AON GPIO port has a low level, and turned off if the control signal has a high level, and the switch comprises a gate terminal to receive the control signal, a drain terminal connecting with a signal receiver for receiving the broadcast signal, and a source terminal connecting with the external apparatus and forming a loop-through route toward the external apparatus.

15. The method according to claim 11, further comprising amplifying the received broadcast signal to have low noise in the normal mode, and wherein the splitting the broadcast signal comprises splitting the broadcast signal amplified to have the low noise into the first broadcast signal and the second broadcast signal.

16. The method according to claim 15, further comprising:

processing and outputting the first broadcast signal to the display apparatus.

17. The method according to claim 11, further comprising:

receiving an input of the user, through a user input device, to convert the operation mode of the broadcast signal receiving apparatus, wherein the broadcast signal receiving apparatus converts the operation mode into the standby mode if the input of the user is received while in the normal mode of the broadcast signal receiving apparatus, and converts the operation mode into the normal mode if the input of the user is received while in the standby mode of the broadcast signal receiving apparatus.

18. The method according to claim 11, wherein the broadcast signal receiving apparatus comprises a set-top box to output a broadcast signal to the display apparatus, and the external apparatus comprises one of a sub-display apparatus other than the display apparatus and another set-top box.

19. A system, comprising:

a broadcast signal receiving apparatus;
a main display apparatus; and
an external apparatus;
the broadcast signal receiving apparatus comprising:
a tuner to receive a broadcast signal from a signal source corresponding to a selected channel when the broadcast signal receiving apparatus is in a normal mode and to provide the received broadcast signal to an external apparatus, wherein the tuner provides the received broadcast signal to the external apparatus without providing the received broadcast signal via a switch, the tuner comprising:
a splitter to split the received broadcast signal into a first broadcast signal to be displayed on a display apparatus and a second broadcast signal to be looped through to the external apparatus; and
a loop-through route provider to loop the second broadcast signal split by the splitter through to the external apparatus;
a signal processor to process the broadcast signal to be displayable on the main display apparatus;
the switch, in response to receiving a control signal directly from a controller that is directly connected to the tuner and the switch, to be turned on or off corresponding to an operation mode of the broadcast signal receiving apparatus, the operation mode including the normal mode and a standby mode; and
the controller to:
in response to the broadcast signal receiving apparatus entering the standby mode, turn on the switch by the control signal to route the broadcast signal through the switch excluding the tuner, to the external apparatus, and cut off power supplied to the tuner after elapsing of a first setting time which starts in response to the entering of the standby mode, wherein the elapsing of a first setting time is determined for the switch to completely turn on in response to entering the standby mode, and
in response to elapsing of a second setting time which starts in response to the broadcast signal receiving apparatus entering in the normal mode, turn off the switch to route the broadcast signal through the tuner, to the external apparatus,
wherein the broadcast signal processed by the signal processor is output to the main display apparatus.

20. The system according to claim 19, wherein the broadcast signal receiving apparatus comprises a set-top box connected to the main display apparatus, and
the external apparatus comprises one of a sub display apparatus and another set-top box.

* * * * *